(12) United States Patent  
Kim et al.

(10) Patent No.: US 9,600,223 B2  
(45) Date of Patent: Mar. 21, 2017

(54) METHOD FOR SHARING SCREEN AND ELECTRONIC DEVICE THEREOF

(71) Applicant: Samsung Electronics Co., Ltd., Gyeonggi-do (KR)

(72) Inventors: Chi-Hwan Kim, Gyeonggi-do (KR); Su-Hyun Kim, Gyeonggi-do (KR); Hyun-Soo Kim, Gyeonggi-do (KR); Soon-Hyun Cha, Seoul (KR)

(73) Assignee: Samsung Electronics Co., Ltd (KR)

( * ) Notice: Subject to any disclaimer, the term of this patent is extended or adjusted under 35 U.S.C. 154(b) by 43 days.

(21) Appl. No.: 14/469,313

(22) Filed: Aug. 26, 2014

(65) Prior Publication Data

US 2015/0061970 A1 Mar. 5, 2015

(30) Foreign Application Priority Data

Aug. 29, 2013 (KR) ........................ 10-2013-0103253

(51) Int. Cl.
*G06F 3/14* (2006.01)
(52) U.S. Cl.
CPC .................................. *G06F 3/1454* (2013.01)
(58) Field of Classification Search
CPC .... G06F 3/1423; G06F 3/1431; G06F 3/1438; G06F 3/1454; H04L 65/403; H04L 67/06; H04L 67/10
USPC ............................ 709/204–207; 345/1.2, 2.3
See application file for complete search history.

(56) References Cited

U.S. PATENT DOCUMENTS

| | | | | |
|---|---|---|---|---|
| 6,154,225 A | * | 11/2000 | Kou | G06F 3/1438 345/213 |
| 8,560,656 B2 | * | 10/2013 | Lee | H04L 12/66 455/90.2 |
| 8,599,311 B2 | * | 12/2013 | Nissan-Cohen | H04N 21/4122 348/552 |
| 2003/0037111 A1 | * | 2/2003 | Yoshioka | G06F 3/1454 709/205 |
| 2004/0070553 A1 | * | 4/2004 | Youden | G06F 3/1423 345/13 |
| 2004/0253991 A1 | * | 12/2004 | Azuma | H04M 3/567 455/566 |
| 2006/0136828 A1 | * | 6/2006 | Asano | G06F 3/1454 715/733 |
| 2008/0218432 A1 | * | 9/2008 | Ota | G06F 3/1431 345/1.3 |
| 2011/0115698 A1 | * | 5/2011 | Chung | G06F 3/1423 345/156 |
| 2011/0191695 A1 | * | 8/2011 | Dinka | G06F 3/0481 715/753 |
| 2012/0023184 A1 | * | 1/2012 | Kuivalainen | H04L 29/06 709/206 |
| 2012/0077586 A1 | | 3/2012 | Pishevar | |

(Continued)

*Primary Examiner* — Tom Sheng
(74) *Attorney, Agent, or Firm* — The Farrell Law Firm, P.C.

(57) ABSTRACT

A method and an apparatus for sharing a screen with a counterpart electronic device in an electronic device are provided. In the method, connection with at least one counterpart electronic device is performed. Data to display on the electronic device or data to transmit to the counterpart electronic device are determined. Data is transmitted to the counterpart electronic device. Data transmission to the counterpart electronic device is stopped based on state information of the electronic device or the counterpart electronic device.

25 Claims, 36 Drawing Sheets

(56) References Cited

U.S. PATENT DOCUMENTS

| | | | |
|---|---|---|---|
| 2012/0088548 A1* | 4/2012 | Yun | G08C 17/02 455/557 |
| 2014/0181686 A1* | 6/2014 | Shin | G06F 3/1454 715/748 |
| 2014/0215358 A1* | 7/2014 | Uratani | G06F 3/048 715/753 |
| 2014/0244738 A1* | 8/2014 | Rydenhag | G06F 3/1423 709/204 |
| 2014/0244739 A1* | 8/2014 | Gardenfors | H04L 65/403 709/204 |
| 2015/0015479 A1* | 1/2015 | Cho | G06F 3/013 345/156 |
| 2015/0279328 A1* | 10/2015 | Ong | G09G 5/14 345/660 |

* cited by examiner

METHOD FOR SHARING SCREEN AND ELECTRONIC DEVICE THEREOF

PRIORITY

This application claims priority under 35 U.S.C. §119(a) to a Korean Patent Application filed in the Korean Intellectual Property Office on Aug. 29, 2013 and assigned Serial No. 10-2013-0103253, the entire disclosure of which is incorporated herein by reference.

BACKGROUND OF THE INVENTION

1. Field of the Invention

The present disclosure generally relates to a method for sharing a screen with one or more counterpart electronic devices, and an electronic device thereof.

2. Description of the Related Art

Due to their portability, electronic devices have become a necessity, and have evolved into a multimedia apparatus providing various services such as voice and video communication functions, an information input/output function, and data transmission/reception.

An electronic device forms a communication connection with a counterpart electronic device to transmit data to the counterpart electronic device or receive data from the counterpart electronic device. For example, an electronic device may perform screen sharing on a counterpart electronic device connected via communication. At this point, the electronic device may transmit a screen displayed on the electronic device to a counterpart electronic device in real-time.

However, there is a problem in that power consumption of an electronic device increases when an electronic device shares information with a counterpart electronic device in real-time.

SUMMARY OF THE INVENTION

An aspect of the present disclosure is to address at least the above-mentioned problems and/or disadvantages and to provide at least the advantages described below. Accordingly, an aspect of the present disclosure is to provide a method and an apparatus in an electronic device for stopping transmission of screen sharing data based on state information of a counterpart electronic device.

Another aspect of the present disclosure is to provide a method and an apparatus in an electronic device for stopping transmission of screen sharing data to a counterpart electronic device when an input occurs in the electronic device after screen sharing.

Still another aspect of the present disclosure is to provide a method and an apparatus in an electronic device for resuming transmission of screen sharing data based on state information of a counterpart electronic device.

Still another aspect of the present disclosure is to provide a method and an apparatus in an electronic device for requesting stopping of data transmission to a counterpart electronic device when an event stopping displaying data transmitted from the counterpart electronic device occurs.

Yet another aspect of the present disclosure is to provide a method and an apparatus in an electronic device for requesting stopping of data transmission to a counterpart electronic device when at least one state change of an idle mode, a power end, rebooting, and screen turn-off occurs while displaying data transmitted from the counterpart electronic device.

Still another aspect of the present disclosure is to provide a method and an apparatus in an electronic device for requesting stopping of data transmission to a counterpart electronic device when a specific portion or more of a region that displays data is hidden while displaying the data transmitted from the counterpart electronic device.

Yet another aspect of the present disclosure is to provide a method and an apparatus in an electronic device for requesting stopping of data transmission to a counterpart electronic device when displaying of data is minimized or a display layer of an upper level than the region that displays the data is generated according to driving of an application while displaying the data transmitted from the counterpart electronic device.

In accordance with an aspect of the present disclosure, a method in an electronic device for sharing a screen with a counterpart electronic device is provided. The method includes performing connection with at least one counterpart electronic device, determining data to display on the electronic device or data to transmit to the counterpart electronic device, transmitting data to the counterpart electronic device, and stopping data transmission to the counterpart electronic device depending on state information of the electronic device or the counterpart electronic device.

In accordance with another aspect of the present disclosure, a method in an electronic device for sharing a screen with a counterpart electronic device is provided. The method includes performing connection with at least one counterpart electronic device, receiving data from the counterpart electronic device, displaying the received data, and when an event for stopping displaying of the data occurs, requesting stopping of data transmission to the counterpart electronic device.

In accordance with another aspect of the present disclosure, an electronic device is provided. The electronic device includes at least one display, one or more memories for storing shared data with at least one counterpart electronic device, and one or more processors for executing a shared module, wherein the shared module performs connection with the counterpart electronic device, determines first data or second data which is at least a portion of the shared data, displays the first data on the display, transmits the second data to the counterpart electronic device, and stops transmission of the second data to the counterpart electronic device based on state information of at least one of the electronic device and the counterpart electronic device.

In accordance with another aspect of the present disclosure, an electronic device is provided. The electronic device includes at least one display, one or more memories for storing shared data with at least one counterpart electronic device, and one or more processors for executing a shared module, wherein the shared module performs connection with the counterpart electronic device, receives data from the counterpart electronic device, displays the received data on the display, and when an event for stopping the displaying of data occurs, requests stopping of data transmission to the counterpart electronic device.

In accordance with another aspect of the present disclosure, a display method of a plurality of electronic devices including a first electronic device and at least one second electronic device is provided. The method includes displaying a shared screen which is at least a portion of a display screen displayed on the first electronic device via the second electronic device, and stopping the displaying of the shared screen via at least one of the first electronic device and the second electronic device based on an event detected by the at least one of the first electronic device and the second electronic device.

In accordance with another aspect of the present disclosure, a first electronic device is provided. The first electronic device includes at least one display, one or more memories for storing shared data with at least one second electronic device, and one or more processors for executing a shared module, wherein the shared module displays a shared screen which is at least a portion of a display screen displayed on a display of the first electronic device via a display of the second electronic device, and stops displaying of the shared screen via at least one of the first electronic device and the second electronic device based on an event detected by the at least one of the first electronic device and the second electronic device.

BRIEF DESCRIPTION OF THE DRAWINGS

The above and other aspects, features and advantages of certain embodiments of the present disclosure will be more apparent from the following description taken in conjunction with the accompanying drawings in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of embodiments of the disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

An electronic device according to the present disclosure may be a combination of one or more of various devices including a smartphone, a tablet Personal Computer (PC), a mobile phone, a video phone, an electronic book reader, a desktop PC, a laptop PC, a netbook computer, a Personal Digital Assistant (PDA), Portable Multimedia Player (PMP), an MP3 player, a mobile medical apparatus, an electronic bracelet, an electronic necklace, an electronic appcessory, a camera, a wearable unit, an electronic watch, a wrist watch, a smart home appliance (e.g., a refrigerator, an air conditioner, a cleaner, an artificial intelligence robot, a Television (TV), a Digital Versatile Disc (DVD) player, an audio player, an oven, an electronic range, a washing machine, an air purifier, an electronic frame), various medical apparatuses (e.g., Magnetic Resonance Angiogram (MRA), Magnetic Resonance Imaging (MRI), Computed Tomography (CT), a photographing apparatus, an ultrasonic apparatus), a navigation unit, a Global Positioning System (GPS) receiver, an Event Data Recorder (EDR), a Flight Data Recorder (FDR), a settop box, a TV box (e.g., SamSung HomeSync™, Apple TV™, or a Google TV™), an electronic dictionary, an automobile infotainment device, an electronic equipment for a ship (e.g., a navigation unit for a ship, a gyro compass), an aero electronic apparatus, a security apparatus, an electronic clothing, an electronic key, a camcorder, a game console, a Head Mounted Display (HMD), a flat display device, an electronic album, a portion of a furniture or a building/structure including a communication function, an electronic board, an electronic signature input unit, a projector, etc. It would be obvious to a person of ordinary skill in the art that an electronic device according to the present disclosure is not limited to the above apparatuses.

Figure 1:
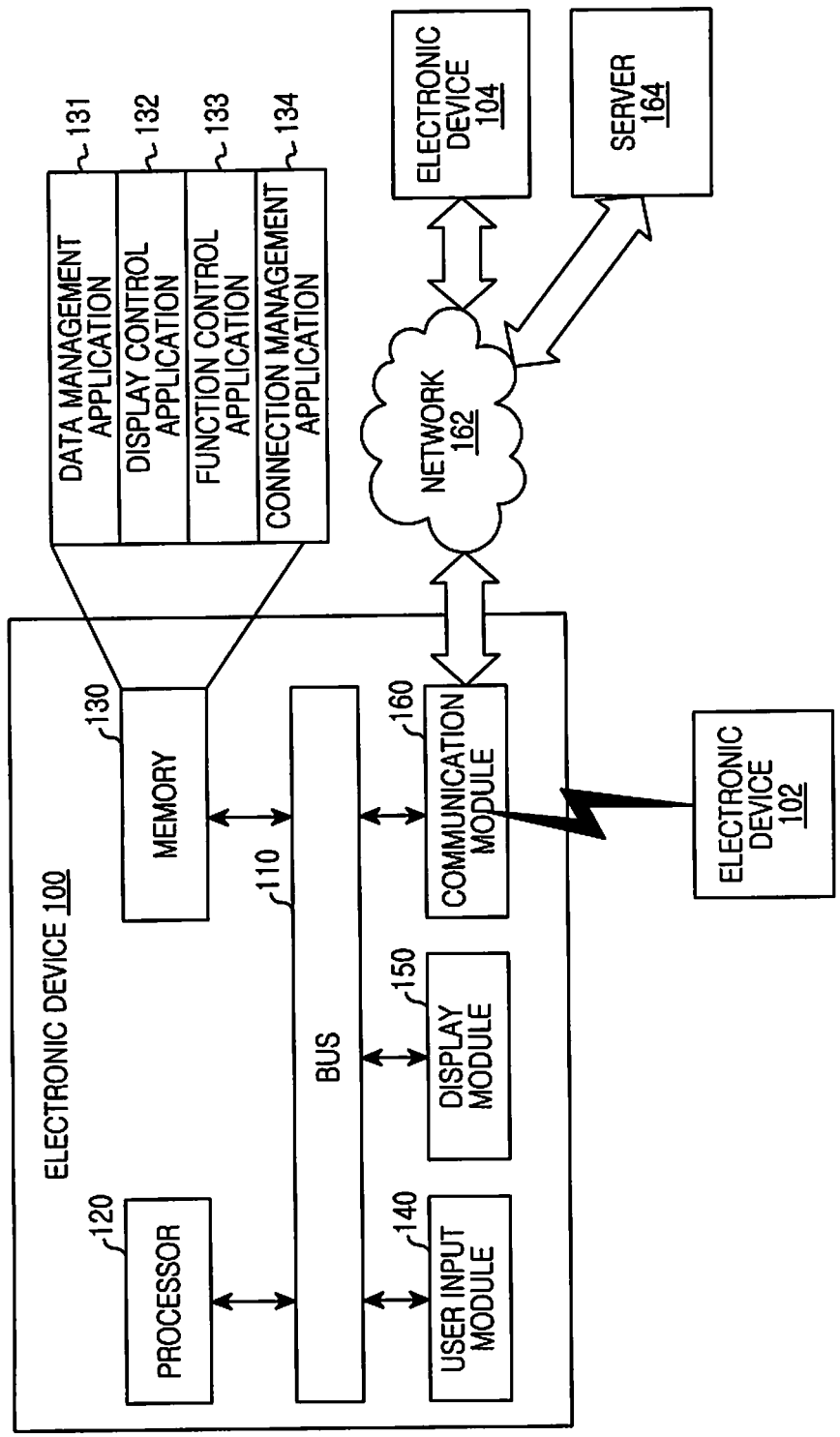
FIG. 1 is a block diagram illustrating an electronic device according to an embodiment of the present disclosure.

FIG. 1 is a block diagram illustrating an electronic device according to an embodiment of the present disclosure.

Referring to FIG. 1, the electronic device 100 includes a bus 110, a processor 120, a memory 130, a user input module 140, a display module 150, or a communication module 160.

The bus 110 may be a circuit for connecting elements included in the electronic device 100 (e.g., the bus 110, the processor 120, the memory 130, the user input module 140, the display module 150, or the communication module 160) with each other, and transferring communication (e.g., a control message) between the elements.

The processor 120 receives instructions from the elements included in the electronic device 100 via the bus 110, decodes the received instructions, and performs an operation or a data process corresponding to the decoded instruction. At this point, the processor 120 may control to execute at least one application stored in the memory 130 and provide a service corresponding to a relevant application. For example, the processor 120 may be configured as in FIG. 2 in order to execute a data management application 131, a display control application 132, a function control application 133, and a connection management application 134, and control screen sharing with a counterpart electronic device.

Also, the processor 120 may include one or more application processors (APs) or one or more communication processors (CPs). Here, the AP and the CP may be included inside the processor 120 or included inside different IC packages, respectively. Also, the AP and the CP may be included inside one IC package. The AP drives an Operating System (OS) or an application to control a plurality of hardware devices or software elements connected to the AP, and performs various data processes including multimedia data and operations. Here, the AP may be implemented as a System on Chip (SoC). Also, the CP performs at least a portion of a multimedia control function. Also, the CP may perform discrimination and authentication of a terminal inside a communication network using a Subscriber Identify Module (SIM). The CP provides a service including voice communication, video communication, a short message or packet data to a user. Also, the CP controls data transmission/reception of the communication module 160. The AP or the CP may load an instruction or data received from at least one of a non-volatile memory or other elements connected to the AP or the CP to a volatile memory and process the same. Also, the AP or the CP may store data received from or generated by at least one of other elements in a non-volatile memory. The CP performs a function for managing a data link and converting a communication protocol in communication between other electronic devices connected with the electronic device including a hardware device via a network. Here, the CP may be implemented as an SoC. Additionally, the processor 120 may further include a Graphic Processing Unit (GPU).

The memory 130 stores an instruction or data received from the processor 120 or other elements, (such as the user interface module 140, the display module 150, and the communication module 160, or generated by the processor 120 or the other elements. The memory may include an internal buffer and an external buffer.

Also, the memory 130 includes the data management application 131, the display control application 132, the function control application 133, and the connection management application 134. Each application may be configured as a programming module, and each programming module may be configured as software, firmware, hardware, or a combination of at least two or more of these.

The data management application 131 includes at least one software element for controlling data storage using an external buffer and an internal buffer of the memory 130 in the electronic device. For example, the data management application 131 may store data in the external buffer to transmit to a counterpart electronic device and store data to display on the electronic device in the internal buffer. For another example, in the case where a screen sharing stop request occurs, the data management application 131 may stop storing data in the internal buffer and the external buffer. The data management application 131 may store a blank image in the internal buffer. Here, the blank image is an image displayed on a display unit in order to minimize power consumption. Though the image has been described as the blank image in various embodiments of the present disclosure, it is not limited thereto, and an image that may minimize power consumption based on a characteristic of the display unit may be used.

The display control application 132 includes at least one software element for determining an electronic device which is to display screen data. For example, when recognizing that a counterpart electronic device displays screen data, the display control application 132 may request the data management application 131 to display the blank image stored in the internal buffer.

The function control application 133 includes at least one software element for controlling a screen share function with a counterpart electronic device in the electronic device. For example, the function control application 133 may request performing/removing of connection with a counterpart electronic device and transmitting/stopping of data via the connection management application 134. The function control application 133 may request displaying/stopping of data via the display control application 132.

The connection management application 134 includes at least one software element for controlling to connect communication with a counterpart electronic device in the electronic device. For example, the connection management application 134 may form/maintain/remove connection with a counterpart electronic device under control of the function control application 133. Also, the connection management application 134 may request the data management application 131 to transmit screen data stored in the external buffer to a counterpart electronic device.

The memory 130 may also include a built-in memory or an external memory. The built-in memory may include at least one of a volatile memory (e.g., DRAM, SRAM, SDRAM) and a non-volatile memory (e.g., OTPROM, PROM, EPROM, EEPROM, mask ROM, flash ROM, NAND flash memory, NOR flash memory). At this point, the built-in memory may have a form of a Solid State Drive (SSD). The external memory may include at least one of Compact Flash (CF), Secure Digital (SD), Micro-SD, Mini-SD, xD, and a memory stick.

Also, the memory 130 may further include a kernel, a middleware, and an Application Programming Interface (API). The kernel controls and manages system resources (e.g., the bus 110, the processor 120, or the memory 130) used for executing an operation or a function implemented in the rest of other programming modules (e.g., the middleware, the API, or an application). Also, the kernel may provide an interface capable of accessing to control and manage an individual element of the electronic device 100 in the middleware, the API, or the application. The middleware performs a mediation role so that the API or the application may communicate with the kernel to give and take data. Also, the middleware 132 may perform load balancing for a task request using a method of assigning an order of priority that may use system resources such as the bus 110, the processor 120, or the memory 130 of the electronic device 100 with respect to task requests received from at least one application. The API is an interface for allowing an application to control a function provided by the kernel or the middleware, and includes at least one interface for file control, window control, image processing or character control, or a function.

The user input module 140 receives an instruction or data from a user and transfers the same to the processor 120 or the memory 130 via the bus 110. For example, the user input module 140 may include a touch panel, a pen sensor, a key, or an ultrasonic input unit. For example, a touch panel recognizes a touch input using at least one of capacitive, resistive, infrared, and ultrasonic methods. The touch panel may further include a controller. The capacitive touch panel may recognize not only a direct touch but also proximity recognition. The touch panel may further include a tactile layer. At this point, the touch panel may provide a tactile reaction to a user. For example, a pen sensor may be implemented using a method that is the same as or similar to receiving the user's touch input, or a separate sheet for recognition. For example, a key may include a keypad or a touch key, and an ultrasonic input unit is a unit for detecting a micro sound wave in the electronic device via a pen that generates an ultrasonic signal to determine data. The ultrasonic input unit may perform wireless recognition.

The display module 150 displays an image, a video, or data to a user. For example, the display module 150 may include a panel or a hologram, and the panel may be an LCD or an AM-OLED. Also, the panel may be implemented such that it is flexible, transparent, or wearable. Here, the panel may be configured as one module together with a touch panel. For example, a hologram may show a three-dimensional image in the air using interference of light. Additionally, the display module 150 may further include a control circuit for controlling the panel or the hologram.

The communication module 160 connects communication between the electronic device 100 and other electronic devices 102 and 104. At this point, the communication module 160 may support a short distance communication protocol 162 such as Wi-Fi, Bluetooth (BT), Near Field Communication (NFC), or network communication such as the Internet, Local Area Network (LAN), Wide Area Network (WAN), telecommunication network, cellular network, satellite network, or Plain Old Telephone System (POTS).

Other electronic devices 102 and 104 may be the same type device as the electronic device 100 or different type devices.

Additionally, the electronic device may further include a sensor module. The sensor module may include at least one of a gesture sensor, a gyro sensor, an atmospheric pressure sensor, a magnetic sensor, an acceleration sensor, a grip sensor, a proximity sensor, an RGB (red, green, blue) sensor, a living body sensor, a temperature/humidity sensor, an illuminance sensor, and a Ultraviolet (UV) sensor. Also, the sensor module may measure a physical quantity or detect an operation state of the electronic device to convert the measured or detected information to an electric signal. For example, the sensor module may include a smelling sensor, an EMG sensor, an EEG sensor, an ECG sensor, or a fingerprint sensor. Also, the sensor module may further include a control circuit for controlling one or more sensors included therein.

Names of hardware elements according to the present disclosure may change depending on the kind of the electronic device. The hardware according to the present disclosure may include at least one of the elements, and omit a portion of the elements, or further include an additional element. Also, a portion of elements of the hardware according to the present disclosure may couple to form one entity and equally perform functions of relevant elements before coupling.

Figure 2:
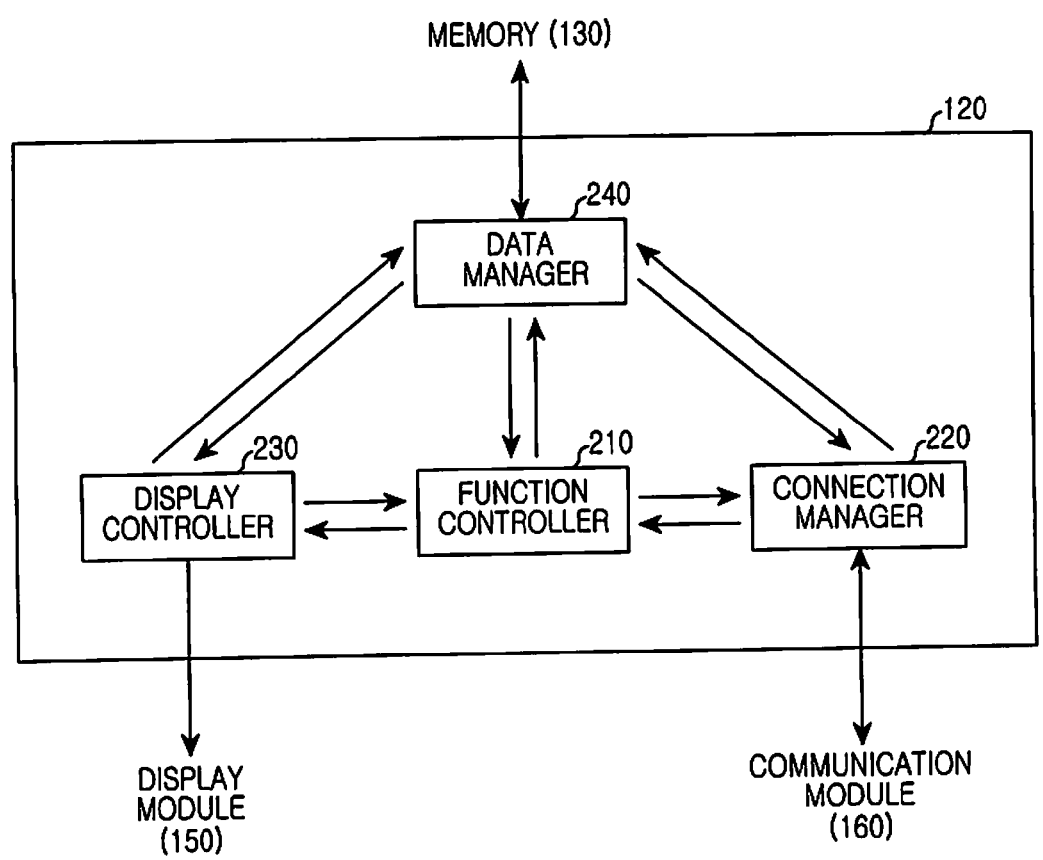
FIG. 2 is a detailed block diagram illustrating a processor according to an embodiment of the present disclosure.

FIG. 2 is a block diagram illustrating a processor according to an embodiment of the present disclosure.

As illustrated in FIG. 2, the processor 120 includes a function controller 210, a connection manager 220, a display controller 230, and a data manager 240.

The function controller 210 executes the function control application 133 stored in the memory 130 in the electronic device to control a screen share function with a counterpart electronic device. For example, the function controller 210 may perform/remove connection with a counterpart electronic device via the connection manager 220, and request data transmission/stoppage. At this point, the function controller 210 may request displaying/stopping of data via the display controller 230.

The connection manager 220 executes the connection management application 134 stored in the memory 130 to perform communication connection with a counterpart electronic device. For example, the connection manager 220 may form/maintain/remove the connection with the counterpart electronic device under control of the function controller 210. Also, the connection manager 220 may request the data manager 240 to transmit screen data stored in the external buffer to the counterpart electronic device.

The display controller 230 executes the display control application 132 stored in the memory 130 to determine an electronic device which is to display screen data. For example, when recognizing that the counterpart electronic device displays the screen data, the display controller 230 may request the data manager 220 to display a blank image stored in the internal buffer.

The data manager 240 executes the data management application 131 stored in the memory 130 to control data storing using the external buffer and the internal buffer. For example, the data manager 240 may store data to transmit to the counterpart electronic device in the external buffer, and store data to display on the electronic device in the internal buffer. At this point, the data manager 240 may store a blank image in the internal buffer. For another example, in the case where a screen share stop request occurs, the data manager 240 may stop storing data in the internal buffer and the external buffer.

Figure 3:
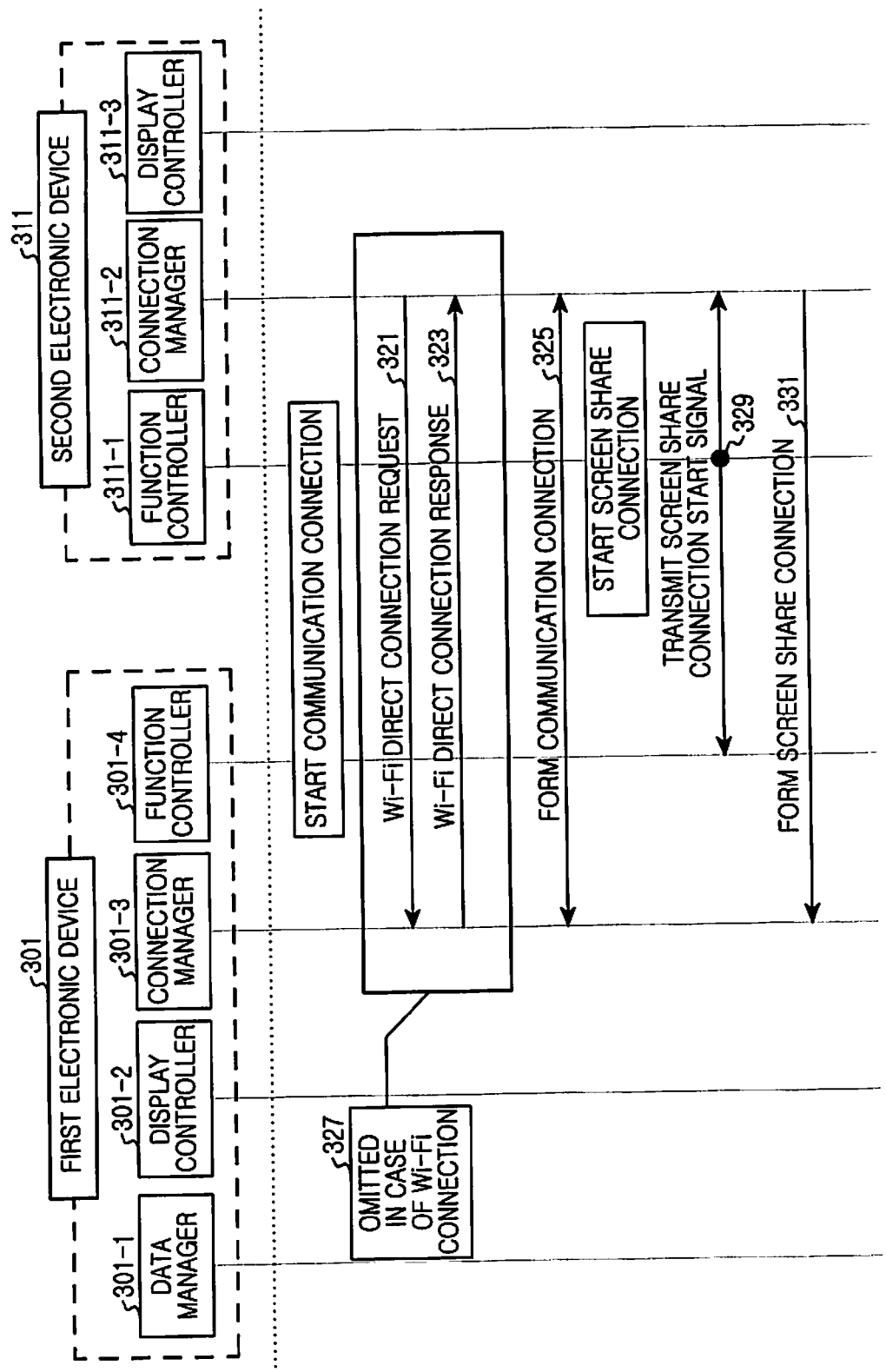
FIG. 3 is a view illustrating a flow for performing connection with a counterpart electronic device in an electronic device according to an embodiment of the present disclosure.

FIG. 3 is a view illustrating a flow for performing connection with a counterpart electronic device in an electronic device according to an embodiment of the present disclosure.

Here, connection between the electronic device and a counterpart electronic device may include a wireless communication scheme or a wired communication scheme. For example, the wired communication scheme may include at least one of a USB, an HDMI, an MHL, and a display port, and the wireless communication scheme may include cellular communication or a short distance wireless communication scheme (e.g., Bluetooth, a Zigbee, Wi-Fi, Wi-Fi direct, and NFC).

Figure 4:
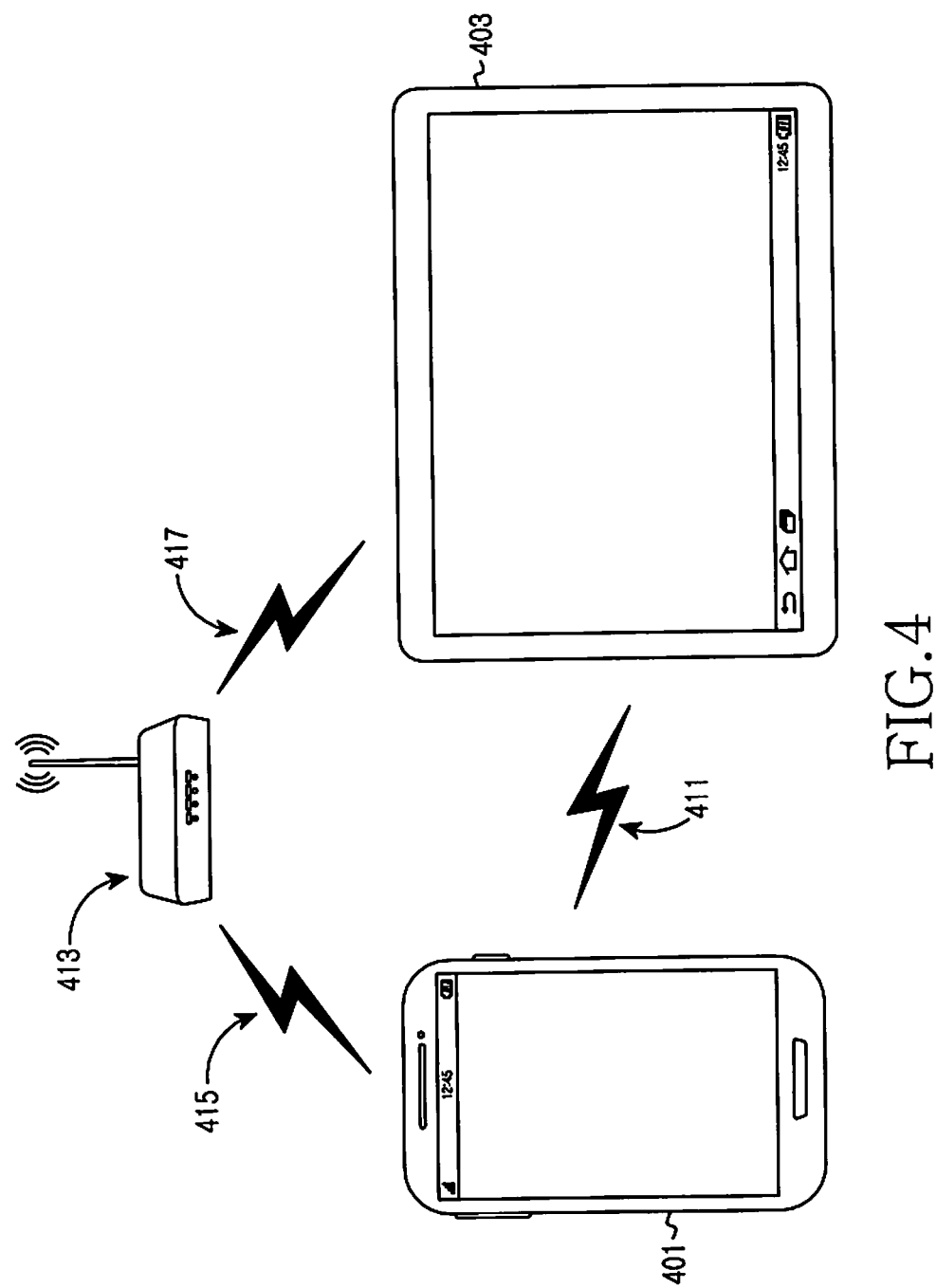
FIG. 4 is a view illustrating apparatus configuration for performing connection with a counterpart electronic device in an electronic device according to an embodiment of the present disclosure.

Referring to FIG. 3, in the case where a user requests connection between a first electronic device 301 and a second electronic device 311, when Wi-Fi Direct is taken as example, a connection manager 311-2 of the second electronic device 311 requests a connection manager 301-3 of the first electronic device 301 to perform Wi-Fi direct connection in step 321. For example, as illustrated in FIG. 4, the second electronic device 403 may request the first electronic device 401 to perform connection via Wi-Fi direct as indicated by reference number 411.

When the first electronic device 301 responds to a Wi-Fi direct connection request at step 323, the first electronic device 301 and the second electronic device 311 exchange information, such as an IP address, Port number, and device name of a counterpart electronic device for forming a communication connection, and form the communication connection based on information of each electronic device at step 325. For example, as illustrated in FIG. 4, a first electronic device 401 and a second electronic device 403 may exchange information of a counterpart electronic device to form the communication connection.

At this point, although communication connection between the first electronic device 301 and the second electronic device 311 has been described using Wi-Fi direct as an example, in case of forming Wi-Fi connection via an AP, the communication connection may be formed without a process of a Wi-Fi direct connection request and a response thereto as shown at reference number 327. For example, as illustrated in FIG. 4, the first electronic device 401 and the second electronic device 403 may form the communication connection using the AP 413 without a process of requesting Wi-Fi direct connection and responding thereto.

After the communication connection is formed, in the case where a screen share event occurs in the second electronic device 311, the function controller 311-1 of the second electronic device 311 transmits screen share connection start signals to the function controller 301-4 of the first electronic device 301 and the connection manager 311-2 of the second electronic device 311 (329), respectively. Accordingly, the connection manager 301-3 of the first electronic device 301 and the connection manager 311-2 of the second electronic device 311 form screen share connection in step 311.

Figure 5:
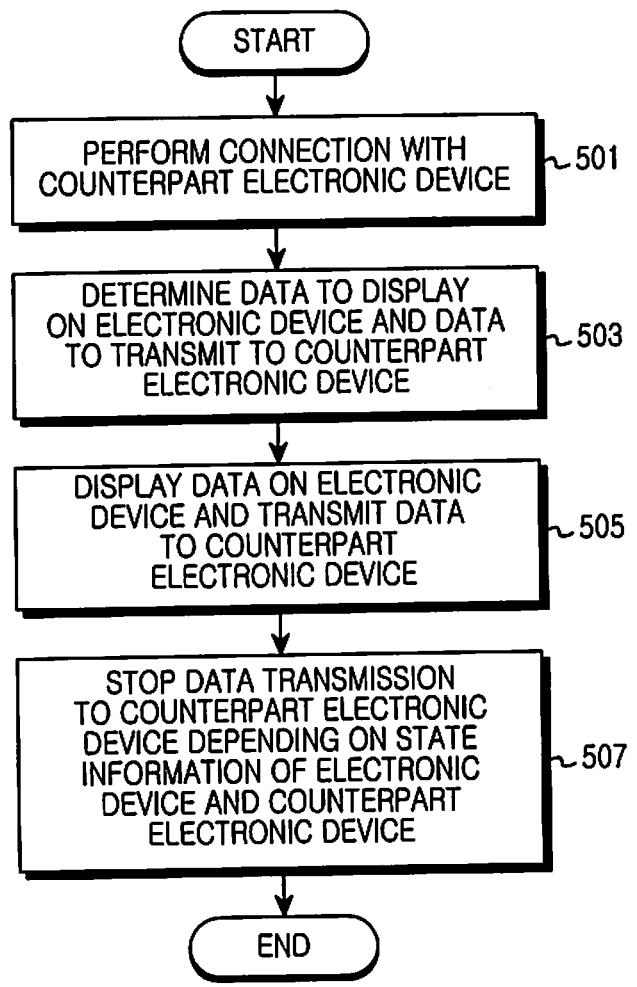
FIG. 5 is a flowchart illustrating a procedure for screen sharing with a counterpart electronic device in an electronic device according to an embodiment of the present disclosure.

FIG. 5 is a flowchart illustrating a procedure for screen sharing with a counterpart electronic device in an electronic device according to an embodiment of the present disclosure.

Referring to FIG. 5, the electronic device performs a connection procedure with a counterpart electronic device in step 501. The electronic device performs connection with the counterpart electronic device using a wireless communication scheme or a wired communication scheme. Here, the wired communication scheme may include at least one of a USB, an HDMI, an MHL, and a display port, and the wireless communication scheme may include cellular communication or a short distance wireless communication scheme, such as Bluetooth, Zigbee, Wi-Fi, Wi-Fi direct, and NFC.

The electronic device determines data to display on the electronic device and data to transmit to the counterpart electronic device in step 503. For example, the electronic device may determine a first storage space for storing data to transmit/display to/on the counterpart electronic device, and a second storage space for storing data to display on the electronic device. The first storage space may be an external buffer, and the second storage space may be an internal buffer. The electronic device may store data in the first storage space and the second storage space.

The electronic device displays data on the electronic device, and transmits data to a counterpart electronic device in step 505. For example, the electronic device may transmit data stored in the first storage space e.g., external buffer to the counterpart electronic device, and display data stored in the second storage space e.g., internal buffer on a display unit. The electronic device may display a blank image on the display unit in order to reduce power consumption.

The electronic device may stop data transmission to the counterpart electronic device based on state information of the electronic device and the counterpart electronic device in step 507. For example, in the case where a request for stopping data transmission occurs in the counterpart electronic device, the electronic device stops data transmission. For another example, in the case where an input event occurs in the electronic device, the electronic device stops data transmission to the counterpart electronic device. The electronic device stops encoding of data to transmit to the counterpart electronic device, but the electronic device may maintain connection with the counterpart electronic device.

After that, the electronic device ends the present algorithm.

Additionally, the electronic device may resume the stopped data transmission depending on the state information of the electronic device and the counterpart electronic device.

Figure 6:
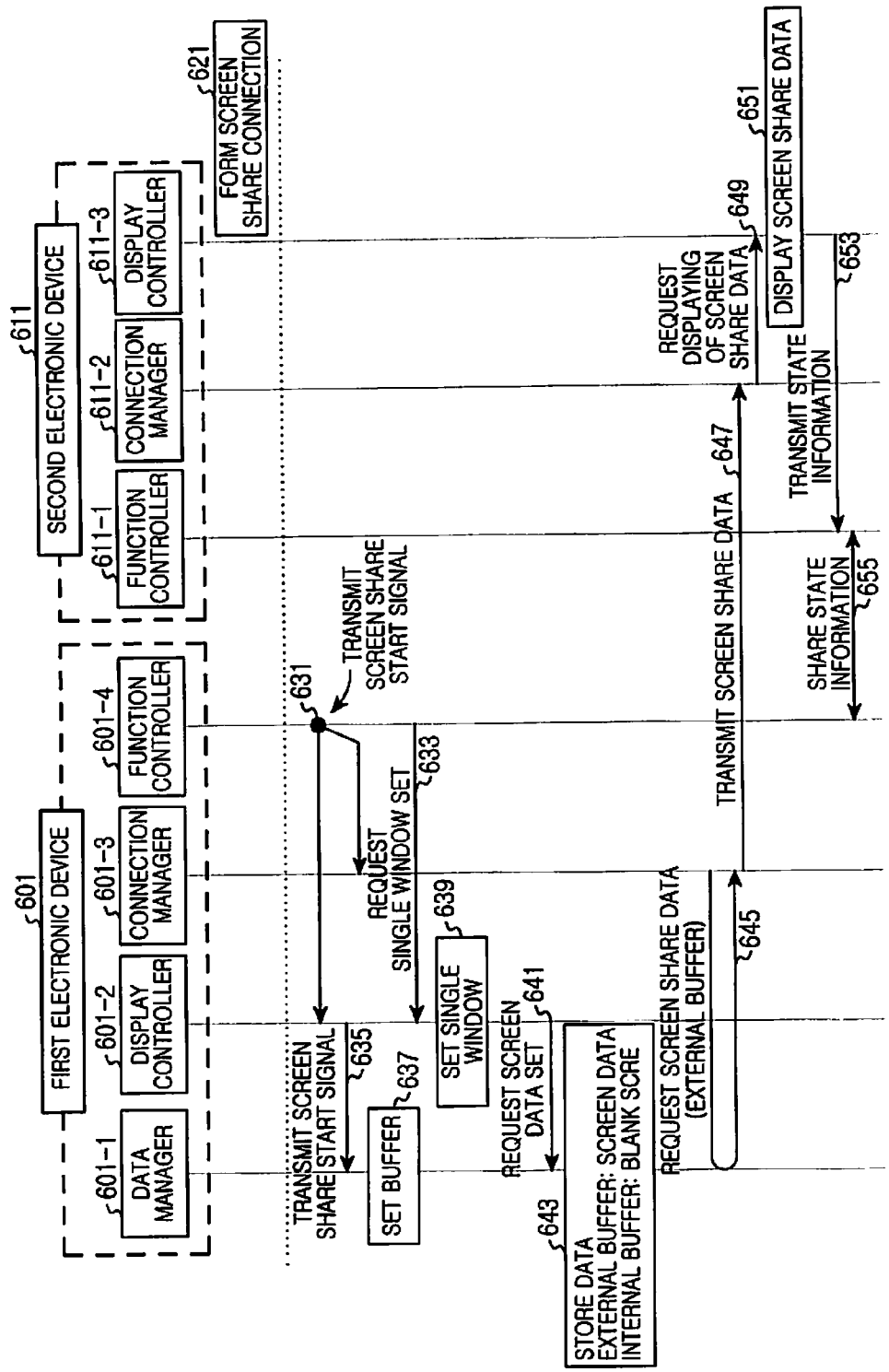
FIG. 6 is a view illustrating a flow for transmitting shared data to a counterpart electronic device in an electronic device according to an embodiment of the present disclosure.

FIG. 6 is a view illustrating a flow for transmitting shared data to a counterpart electronic device in an electronic device according to an embodiment of the present disclosure.

Referring to FIG. 6, in the case where screen share connection is formed between a first electronic device 601 and a second electronic device 611 in step 621, a function controller 601-4 of the first electronic device 601 transmits a screen share start signal to a display controller 601-2 and a connection manager 601-3 in step 631. At this point, the function controller 601-4 requests the display controller 601-2 to set a single window in step 633.

The display controller 601-2 that has received a screen share start signal transmits a screen share start signal to a data manager 601-1 in step 635. At this point, the data manager 601-1 sets a buffer for storing screen data in step 637.

The display controller 601-2 requested to set the single window determines a window state, and when a multi-window is in operation, releases a multi-window function to set the single window in step 639. Also, the display controller 601-2 informs the data manager 601-1 of the electronic device on which screen data is to be displayed in step 641. For example, the display controller 601-2 may request the data manager 601-1 to store screen data in the external buffer to be used for transmission of screen sharing data to the second electronic device 611.

The data manager 601-1 stores screen data in the buffer based on a request of the display controller 601-2 in step 643. For example, the data manager 601-1 may store screen data in the external buffer, and store a blank image in the internal buffer in step 643.

The connection manager 601-3 that has received a screen share start signal may request the data manager 601-1 to transmit screen share data for transmission to the second electronic device 611 in step 645. At this point, the data manager 601-1 transmits screen data stored in the external buffer to the connection manager 601-3, and the connection manager 601-3 transmits screen share data to the connection manager 611-2 of the second electronic device 611 in step 647.

The connection manager 611-2 of the second electronic device 611 that has received the screen share data from the connection manager 601-3 of the first electronic device 601 requests displaying of the screen share data via the display controller 611-3 in step 649. Accordingly, the display controller 611-3 displays the screen share data in step 651.

The display controller 611-3 transmits state information to the function controller 611-1 in step 653, and the function controller 611-1 shares the state information of the display controller 611-3 with the function controller 601-4 of the first electronic device 601 to control synchronization of the screen share data in step 655.

Figure 7A:
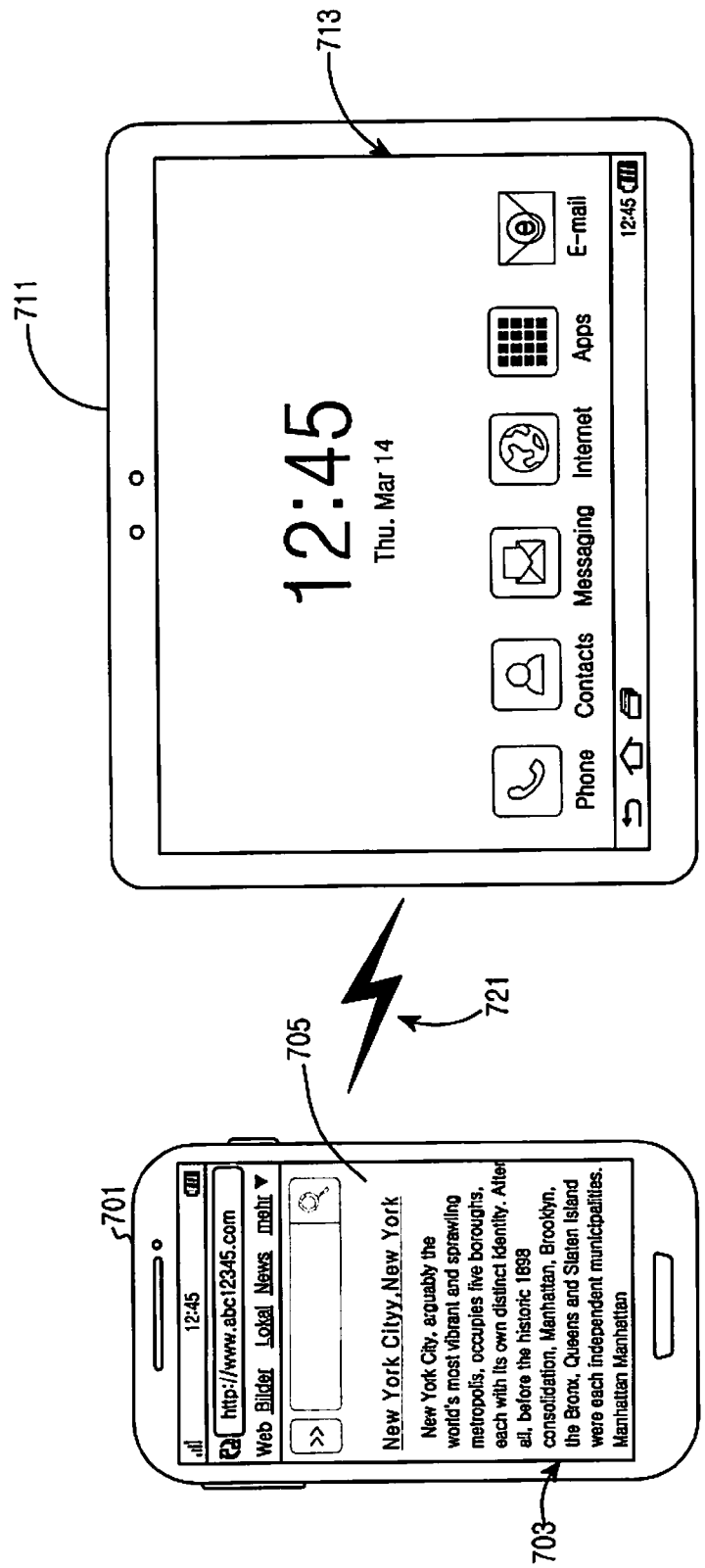
FIGS. 7A and 7B are views illustrating screen configurations for transmitting screen sharing data to a counterpart electronic device in an electronic device according to an embodiment of the present disclosure.
Figure 7B:
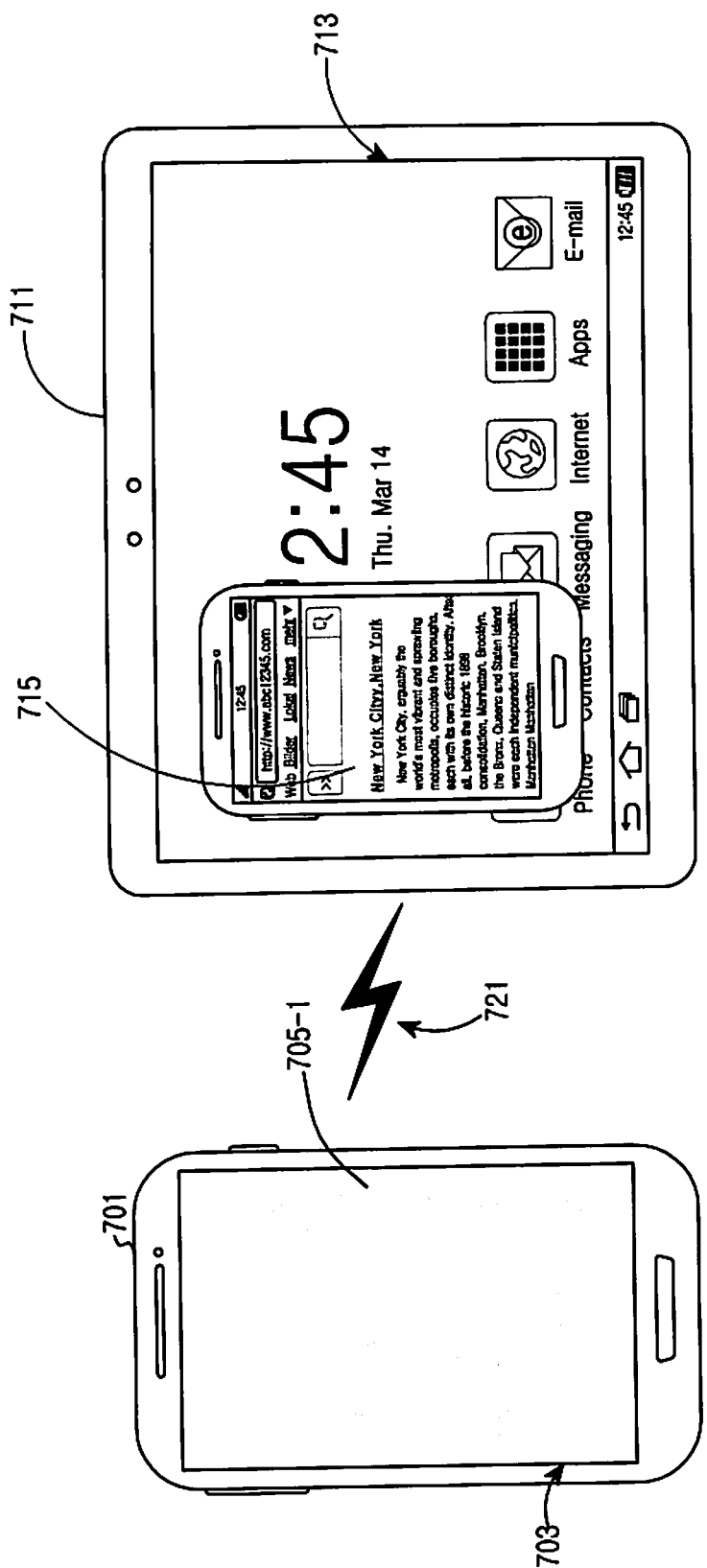

For example, as illustrated in FIG. 7A, in the case where screen share connection is formed as indicated by reference number 721 between a first electronic device 701 and a second electronic device 711, the first electronic device 701 that has received a screen share start signal sets a buffer for storing screen data. At this point, the first electronic device 701 determines to store data to transmit to the second electronic device 711 in the external buffer, and to store data to display on the first electronic device 701 in the internal buffer. For example, the first electronic device 701 may store screen data in the external buffer, and store a blank image in the internal buffer. After that, as illustrated in FIG. 7B, the first electronic device 701 displays the blank image 705-1 stored in the internal buffer on the display unit 703, and the second electronic device 711 displays screen data 715 transferred from the first electronic device 701 on a display unit 713 (or the second electronic device 711 displays the screen data 715 and an image of the first electronic device 701 transferred from the first electronic device 701 on a display unit 713). The first electronic device 701 and the second electronic device 711 share state information with each other to adjust synchronization of the screen share data as indicated by reference number 721.

Figure 8:
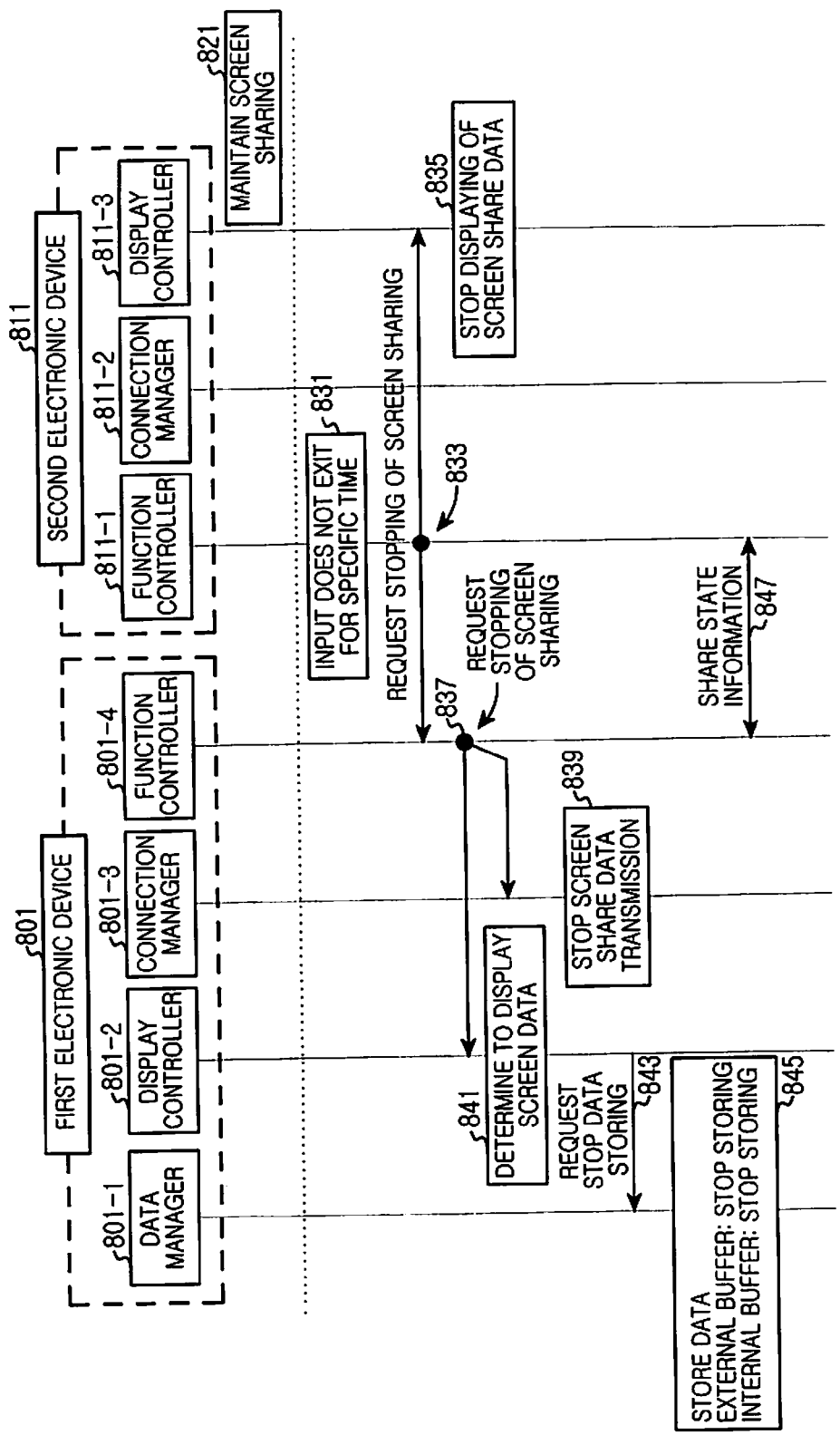
FIG. 8 is a view illustrating a flow for stopping screen sharing data transmission based on state information of each electronic device in an electronic device according to an embodiment of the present disclosure.

FIG. 8 is a view illustrating a flow for stopping screen sharing data transmission based on state information of each electronic device in an electronic device according to an embodiment of the present disclosure.

Referring to FIG. 8, while a screen is shared between a first electronic device 801 and a second electronic device 811 in step 821, a function controller 811-1 of the second electronic device 811 determines whether a user's input exists for a specific time. When determining the user's input does not exist for the specific time in step 831, the function controller 811-1 requests a display controller 811-3 and a function controller 801-4 of the first electronic device 801 to stop screen sharing in step 833.

The display controller 811-3 of the second electronic device 811 that has been requested to stop the screen sharing stops displaying the screen share data in step 835.

Also, the function controller 801-4 of the first electronic device that has been requested to stop the screen sharing requests a display controller 801-2 and a connection manager 801-3 to stop the screen sharing in step 837. At this point, the connection manager 801-3 stops screen data transmission to the second electronic device 811 in step 839. Also, the display controller 801-2 determines an electronic device which is to display screen data in step 841. At this point, the display controller 801-2 requests the data manager 801-1 to stop storing data in both an external buffer and an internal buffer in step 843. Accordingly, the data manager 801-1 stops storing data in both the external buffer and the internal buffer in step 845.

The function controller 811-1 of the second electronic device 811 and the function controller 801-4 of the first electronic device 801 share state information with each other to adjust synchronization in step 847.

Figure 9:
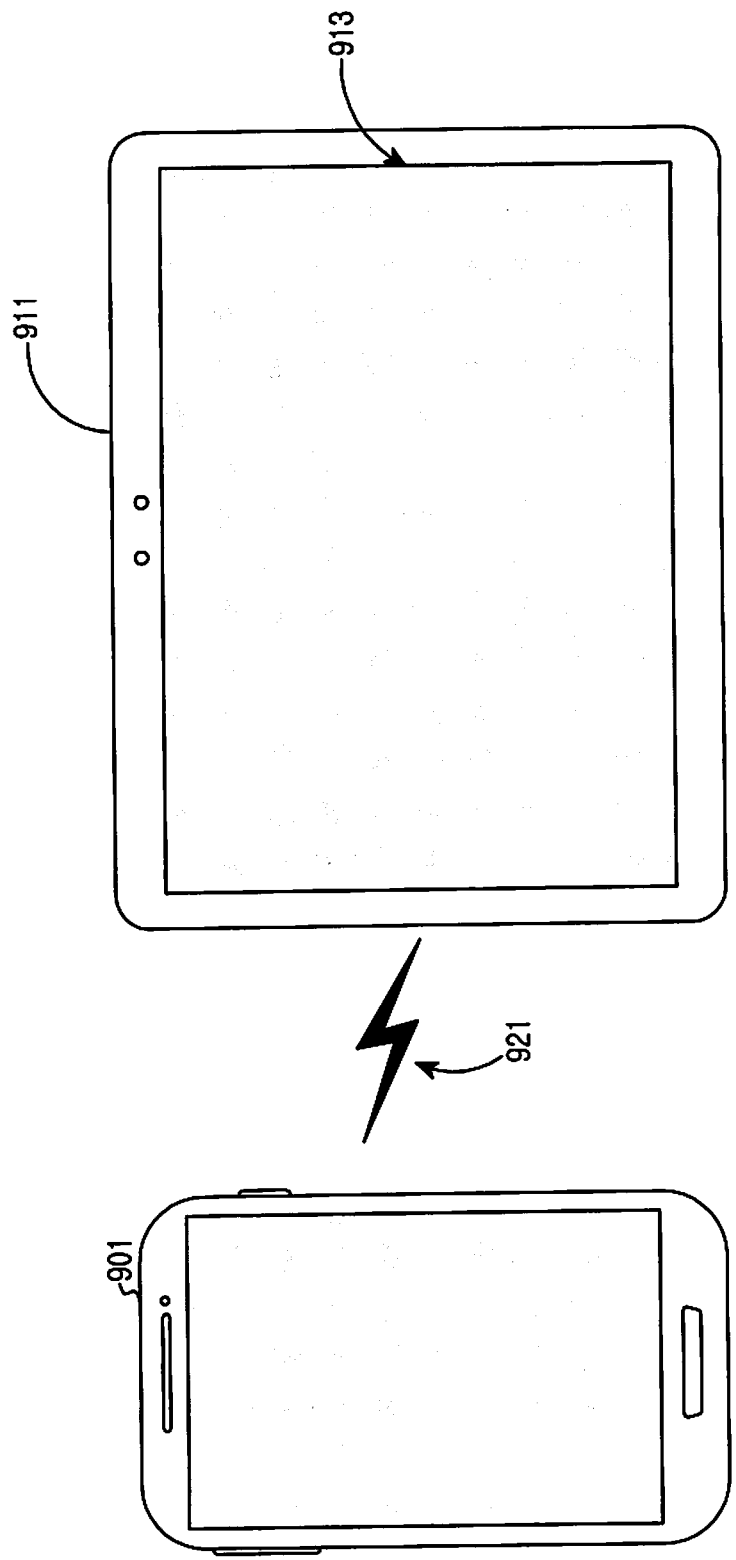
FIG. 9 is a view illustrating screen configurations for stopping screen sharing data transmission based on state information of each electronic device in an electronic device according to an embodiment of the present disclosure.

For example, as illustrated in FIG. 7B, while a screen is shared as indicated by reference number 721 between the first electronic device 701 and the second electronic device 711, the second electronic device 711 determines whether a user's input exists for a specific time. When determining the user's input does not exist for the specific time, the second electronic device 711 requests the first electronic device 701 to stop screen sharing. At this point, as illustrated in FIG. 9, a second electronic device 911 stops displaying of screen share data. Also, a first electronic device 901 that has been requested to stop screen sharing stops screen data transmission to the second electronic device 911. At this point, the first electronic device 901 stops storing data in both an external buffer and an internal buffer. The first electronic device 901 also stops encoding of data to transmit to the second electronic device 911. The first electronic device 901 and the second electronic device 911 share state information with each other to adjust synchronization of screen share data as indicated by reference number 921.

Figure 10:
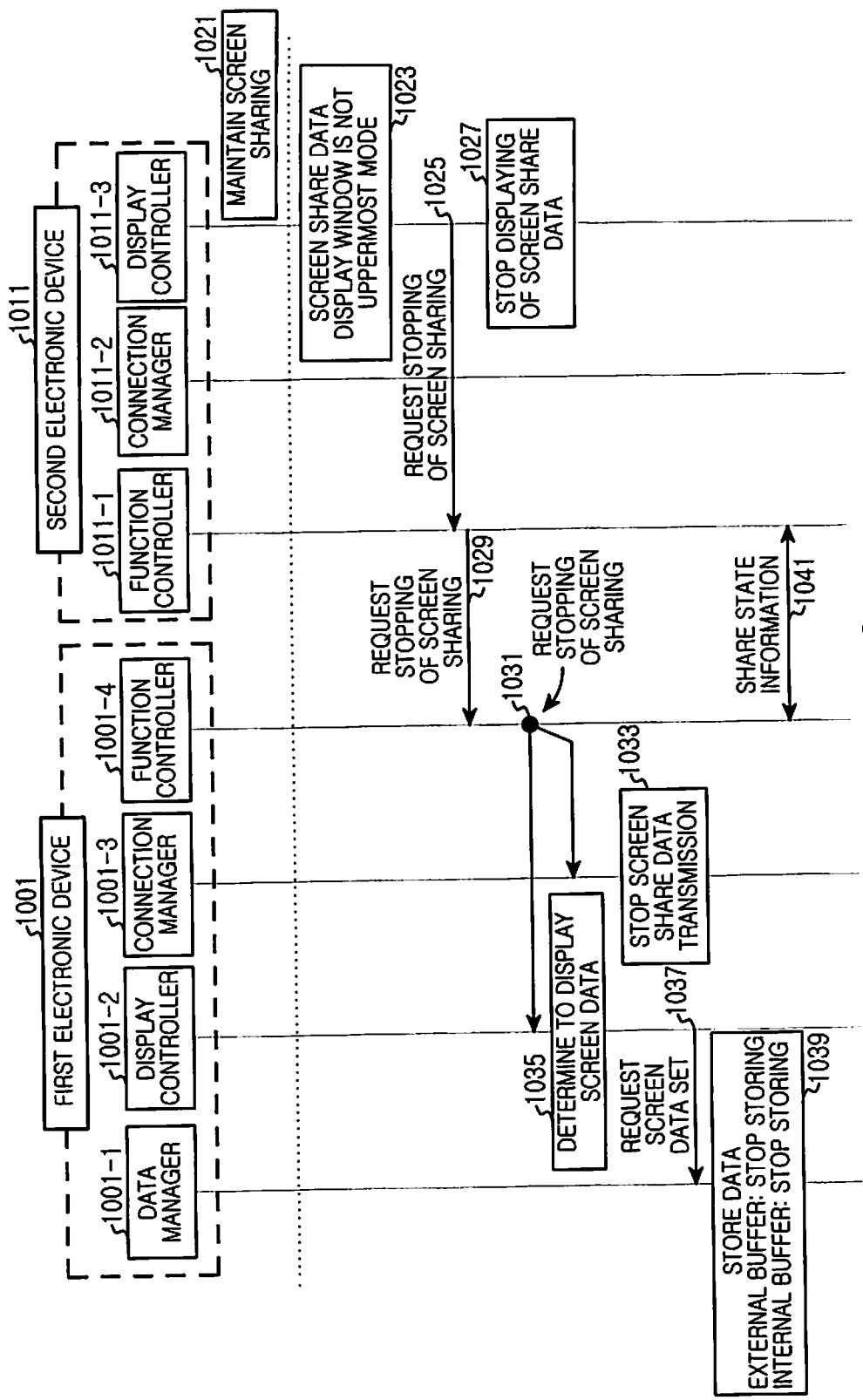
FIG. 10 is a view illustrating a flow for stopping screen sharing data transmission based on state information of each electronic device in an electronic device according to an embodiment of the present disclosure.

FIG. 10 illustrates a flow for stopping screen sharing data transmission based on state information of each electronic device in an electronic device according to an embodiment of the present disclosure.

Referring to FIG. 10, while a screen is shared in step 1021 between a first electronic device 1001 and a second electronic device 1011, a display controller 1011-3 of the second electronic device 1011 determines whether a display window of screen share data is in an uppermost mode. When the screen share data display window is not in the uppermost mode in step 1023, the display controller 1011-3 requests a function controller 1011-1 to stop screen sharing in step 1025. At this point, the display controller 1011-3 may stop displaying of screen share data in step 1027. Also, the function controller 1011-1 requests the function controller 1001-4 of the first electronic device 1001 to stop screen sharing in step 1029.

The function controller 1001-4 of the first electronic device 1001 that has been requested to stop screen sharing requests a display controller 1001-2 and a connection manager 1001-3 to stop screen sharing in step 1031. At this point, the connection manager 1001-3 stops transmission of screen data to the second electronic device 1011 in step 1033. Also, the display controller 1001-2 determines an electronic device which is to display screen data in step 1035. The display controller 1001-2 requests a data manager 1001-1 to stop storing data in both an external buffer and an internal buffer in step 1037. Accordingly, the data manager 1001-1 stops storing data in both the external buffer and the internal buffer in step 1039.

The function controller 1011-1 of the second electronic device 1011 and the function controller 1001-4 of the first electronic device 1001 share state information with each other to adjust synchronization in step 1041.

Figure 11A:
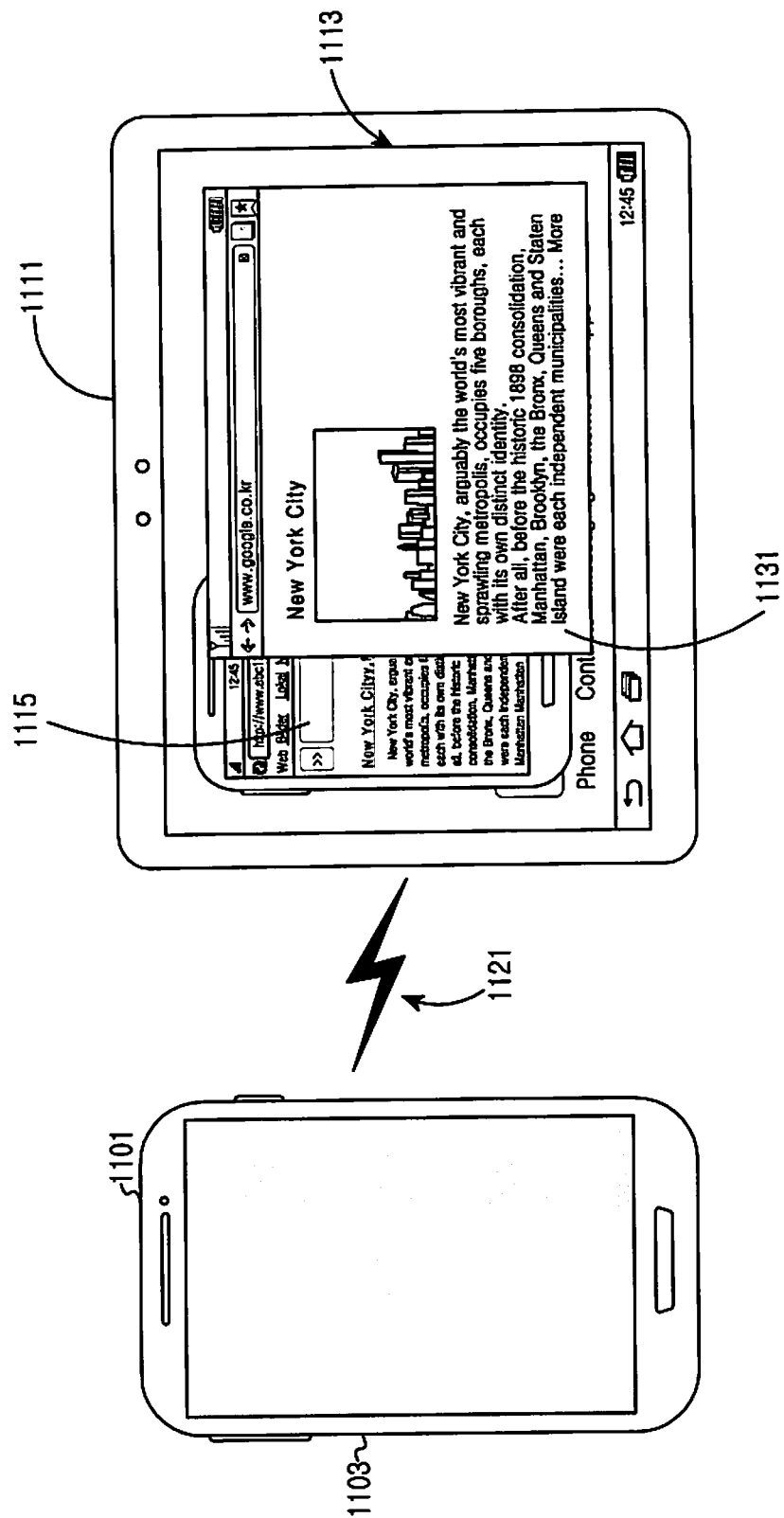
FIGS. 11A and 11B are views illustrating screen configurations for stopping screen sharing data transmission based on state information of each electronic device in an electronic device according to an embodiment of the present disclosure.

For example, as illustrated in FIG. 11A, while a screen is shared as indicated by reference number 1121 between a first electronic device 1101 and a second electronic device 1111, in the case where a screen share data display window 1115 is hidden by window 1131 by a specific portion or more due to execution of an application in the second electronic device 1111, the second electronic device 1111 requests the first electronic device 1101 to stop screen sharing. At this point, the second electronic device 1111 stops displaying screen share data. Also, the first electronic device 1101 that has been requested to stop screen sharing stops transmission of screen data to the second electronic device 1111. At this point, the first electronic device 1101 may stop storing data in both an external buffer and an internal buffer, and stops encoding of data to transmit to the second electronic device 1111. The first electronic device 1101 and the second electronic device 1111 share state information with each other to adjust synchronization of screen share data as indicated by reference number 1121.

Figure 11B:
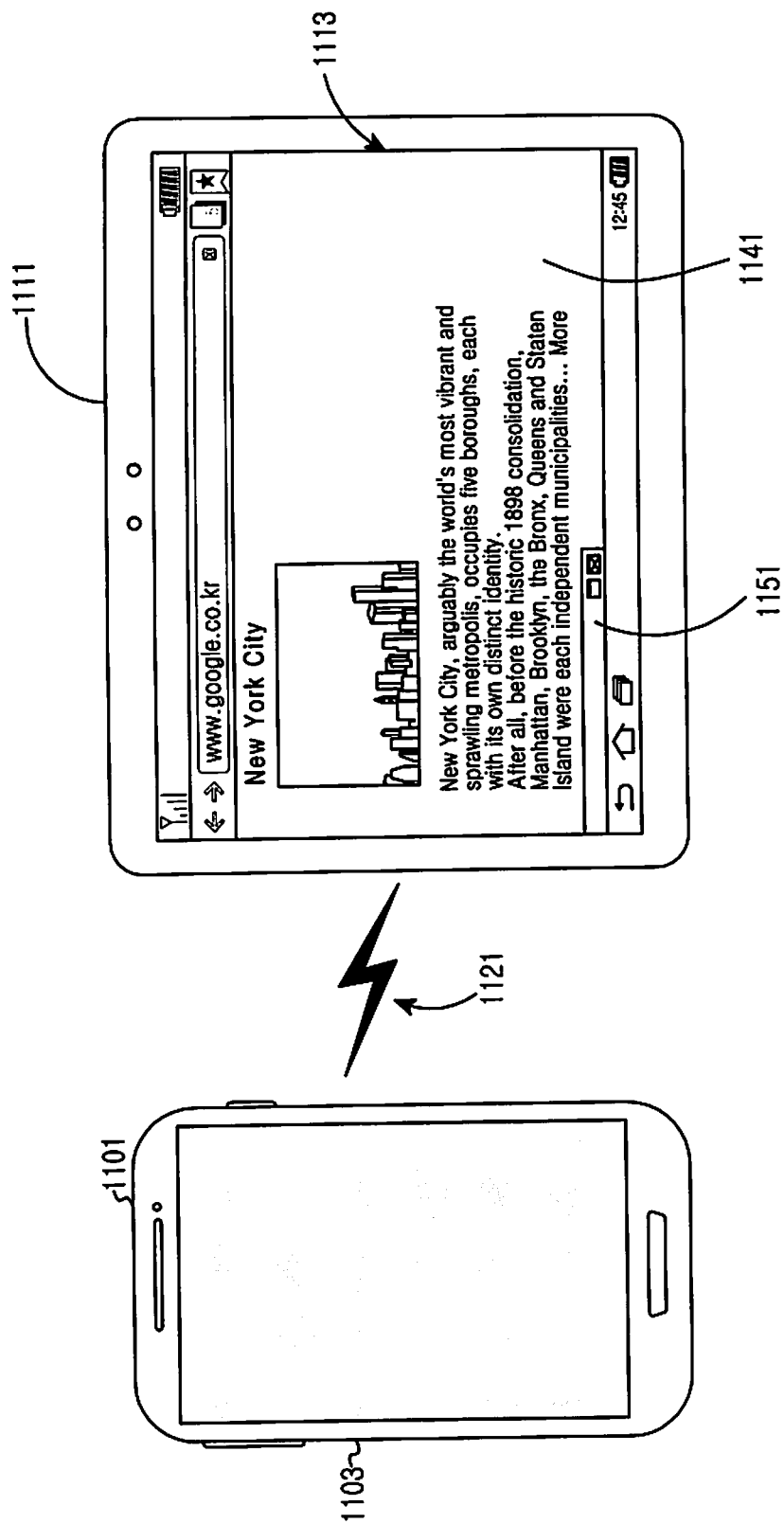

For another example, as illustrated in FIG. 11B, while a screen is shared as indicated by reference number 1121 between the first electronic device 1101 and the second electronic device 1111, in the case where the screen share data display window 1115 is switched to a minimize state as indicated by reference number 1151 due to execution of an application in the second electronic device 1111, the second electronic device 1111 requests the first electronic device 1101 to stop screen sharing. At this point, the second electronic device 1111 stops displaying screen share data. Also, the first electronic device 1101 that has been requested to stop screen sharing requests the second electronic device 1111 to stop transmission of screen data. At this point, the first electronic device 1101 stops storing data in both the external buffer and the internal buffer, and stops encoding of data to transmit to the second electronic device 111. The first electronic device 1101 and the second electronic device 1111 share state information with each other to adjust synchronization of screen share data as indicated by reference number 1121.

Figure 12:
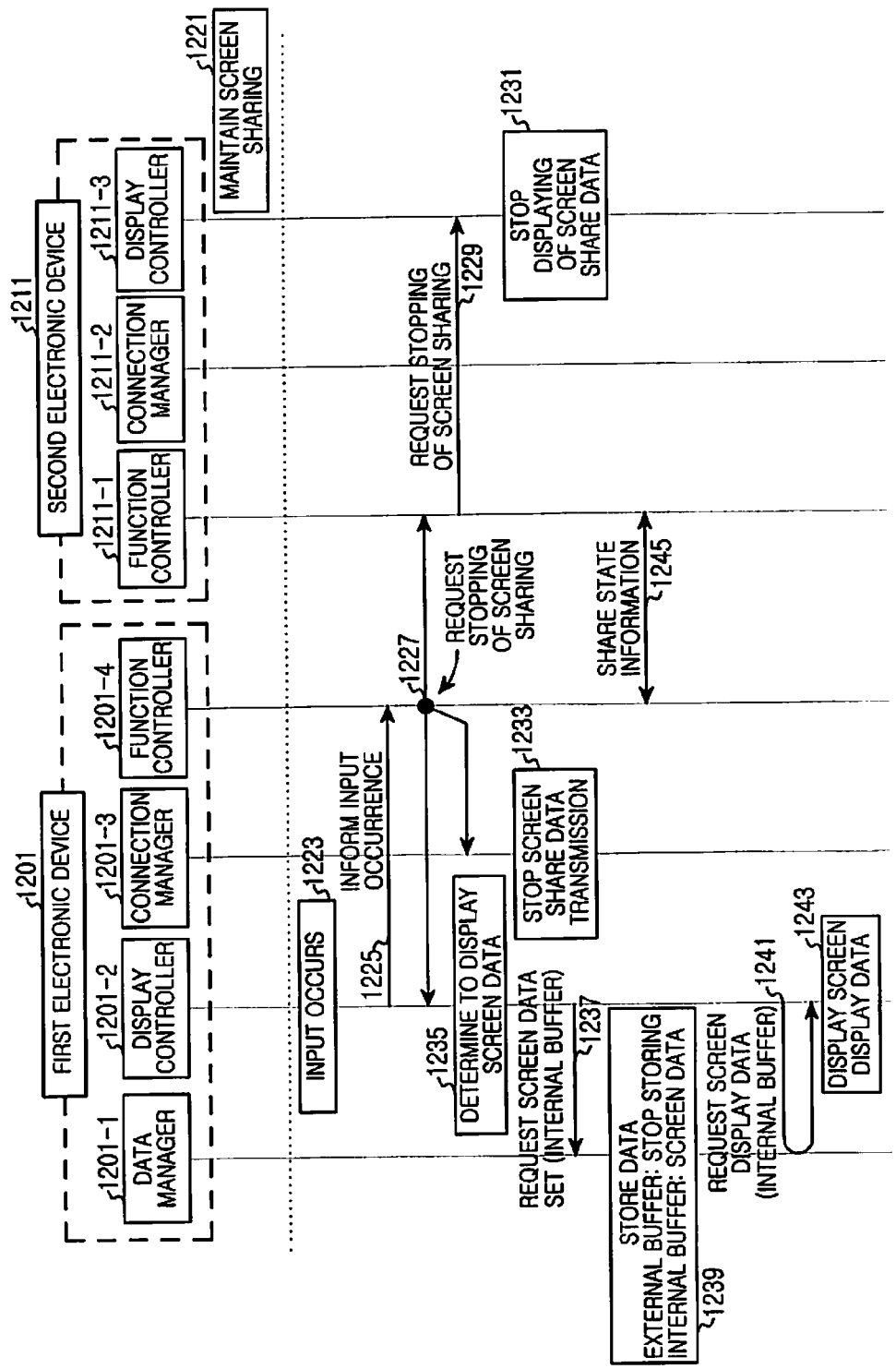
FIG. 12 is a view illustrating a flow for stopping screen sharing data transmission based on state information of each electronic device in an electronic device according to an embodiment of the present disclosure.

FIG. 12 illustrates a flow for stopping screen sharing data transmission based on state information of each electronic device in an electronic device according to an embodiment of the present disclosure.

Referring to FIG. 12, while a screen is shared in step 1221 between a first electronic device 1201 and a second electronic device 1211, a display controller 1201-2 of the first electronic device 1201 determines whether a user's input occurs. In the case where the user's input occurs in step 1223, the display controller 1201-2 informs a function controller 1201-4 of the occurrence of the user's input in step 1225. At this point, when the user's input occurs, the function controller 1201-4 recognizes the user intends to use the first electronic device 1201. Accordingly, the function controller 1201-4 requests a connection manager 1201-3, the display controller 1201-2, and a function controller 1211-1 of the second electronic device 1211 to stop screen sharing in step 1227.

The function controller 1211-1 of the second electronic device 1211 that has been requested to stop screen sharing requests a display controller 1211-3 to stop screen sharing in step 1229. At this point, the display controller 1211-3 stops displaying of screen share data in step 1231.

Meanwhile, the connection manager 1201-3 of the first electronic device 1201 that has been requested to stop screen sharing stops transmission of screen data to the second electronic device 1211 in step 1233. Also, the display controller 1201-2 determines an electronic device which is to display screen data in step 1235. At this point, the display controller 1201-2 requests the data manager 1201-1 to stop storing data in an external buffer and to store screen data in an internal buffer in step 1237. Accordingly, the data manager 1201-1 stops storing data in the external buffer, and stores screen data in the internal buffer in step 1239. After that, the display controller 1201-2 requests the data manager 1201-1 to transfer screen display data in order to display screen data in step 1241. At this point, the data manager 1201-1 transmits screen data stored in the internal buffer to the display controller 1201-2, and the display controller 1201-2 displays screen display data in step 1243.

The function controller 1211-1 of the second electronic device 1211 and the function controller 1201-4 of the first electronic device 1201 share state information with each other to adjust synchronization in step 1245.

Figure 13A:
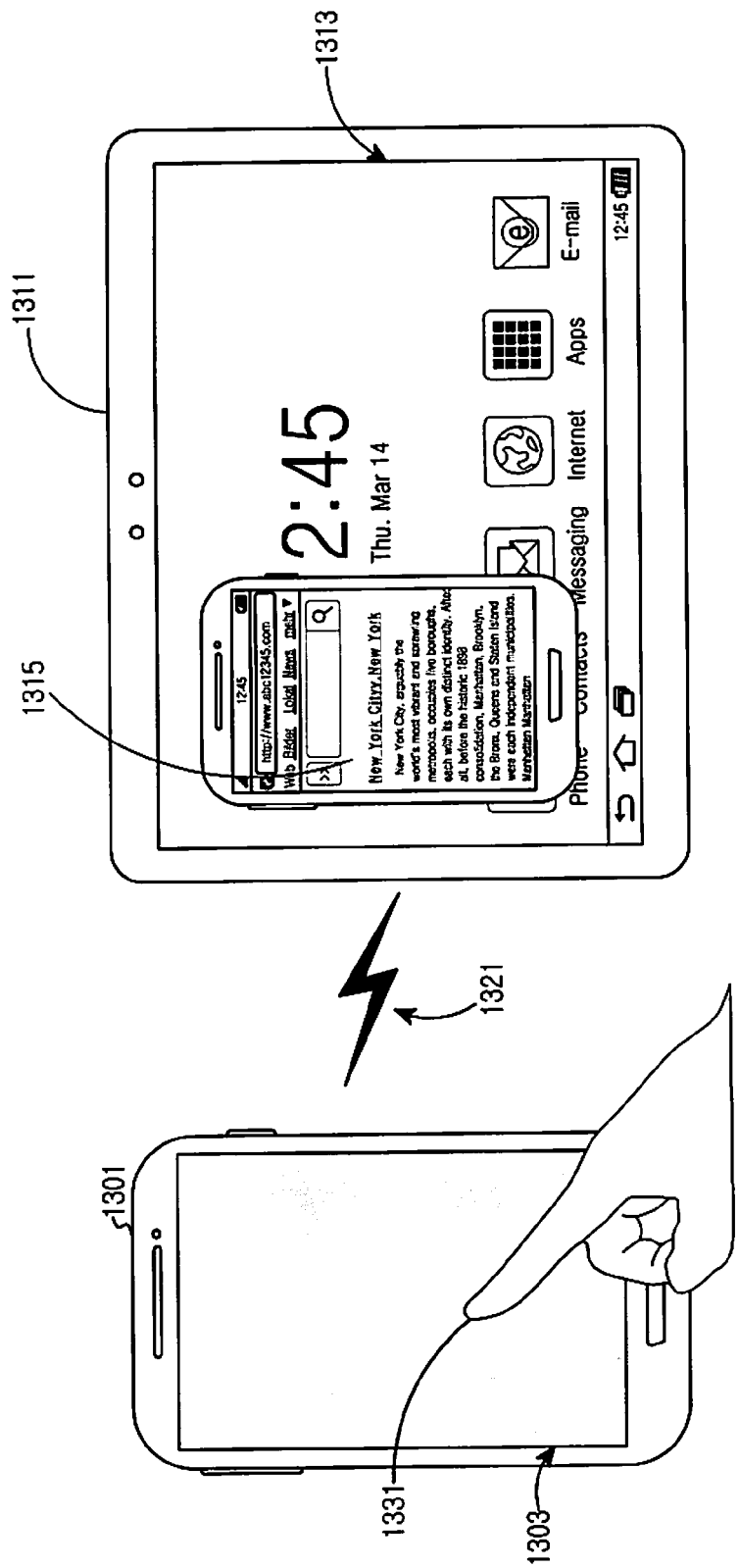
FIGS. 13A and 13B are views illustrating screen configurations for stopping screen sharing data transmission based on state information of each electronic device in an electronic device according to an embodiment of the present disclosure.
Figure 13B:
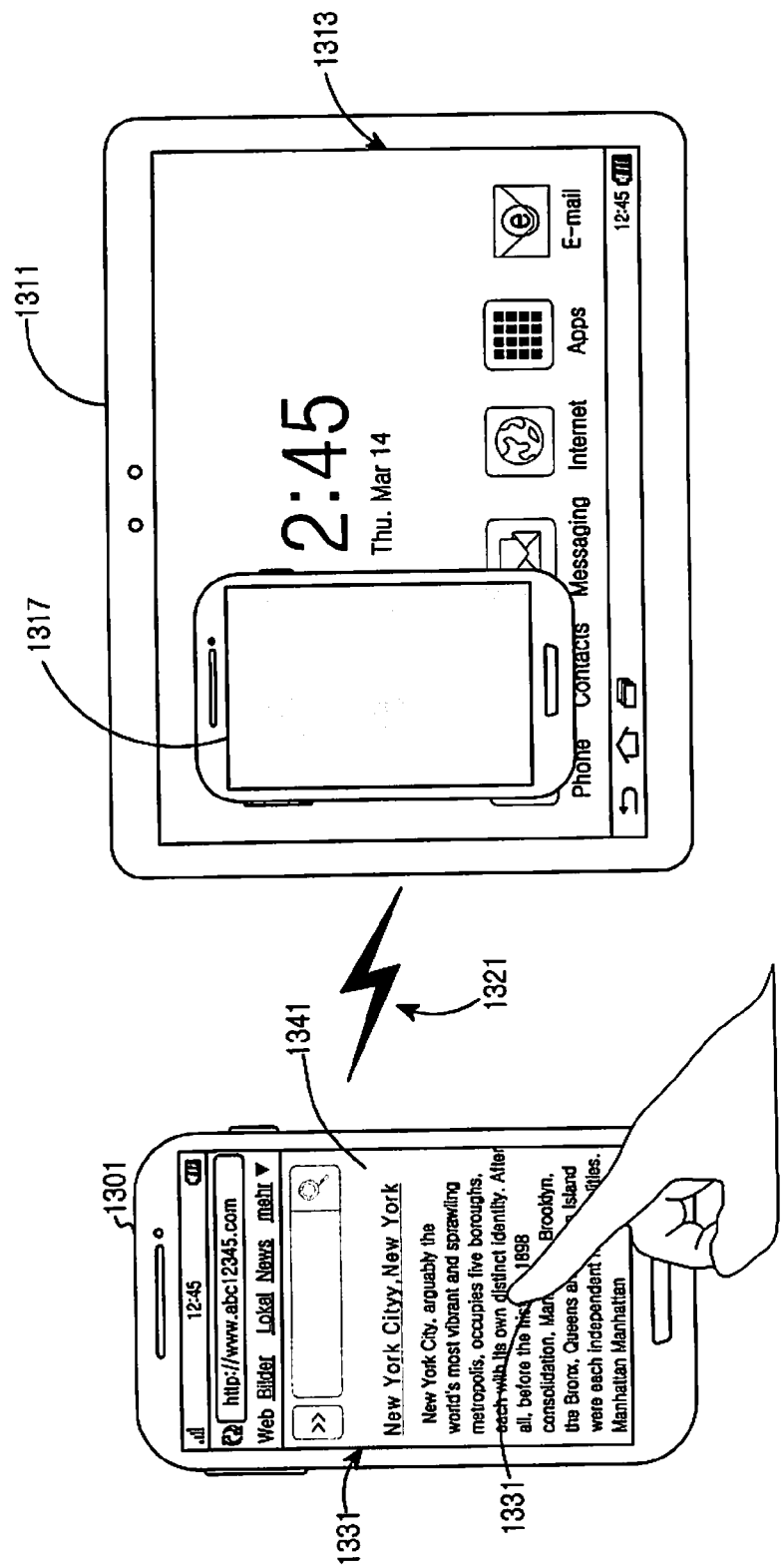

For example, as illustrated in FIG. 13A, while a screen is shared as indicated by reference number 1321 between a first electronic device 1301 and a second electronic device 1311, in the case where a user's input occurs in the first electronic device 1301 as indicated by reference number 1331, the first electronic device 1301 requests the second electronic device 1311 to stop screen sharing. At this point, as illustrated in FIG. 13B, the second electronic device 1311 stops displaying of screen share data as indicated by reference number 1317. Also, the first electronic device 1301 stops transmission of screen data to the second electronic device 1311. At this point, the first electronic device 1301 stops storing data in an external buffer, and stores screen data in an internal buffer, and stops encoding of data to transmit to the second electronic device 1311. Simultaneously, the first electronic device 1301 displays screen data stored in the internal buffer as indicated by reference number 1341. The first electronic device 1301 and the second electronic device 1311 may share state information with each other to adjust synchronization of screen share data as indicated by reference number 1321.

Figure 14:
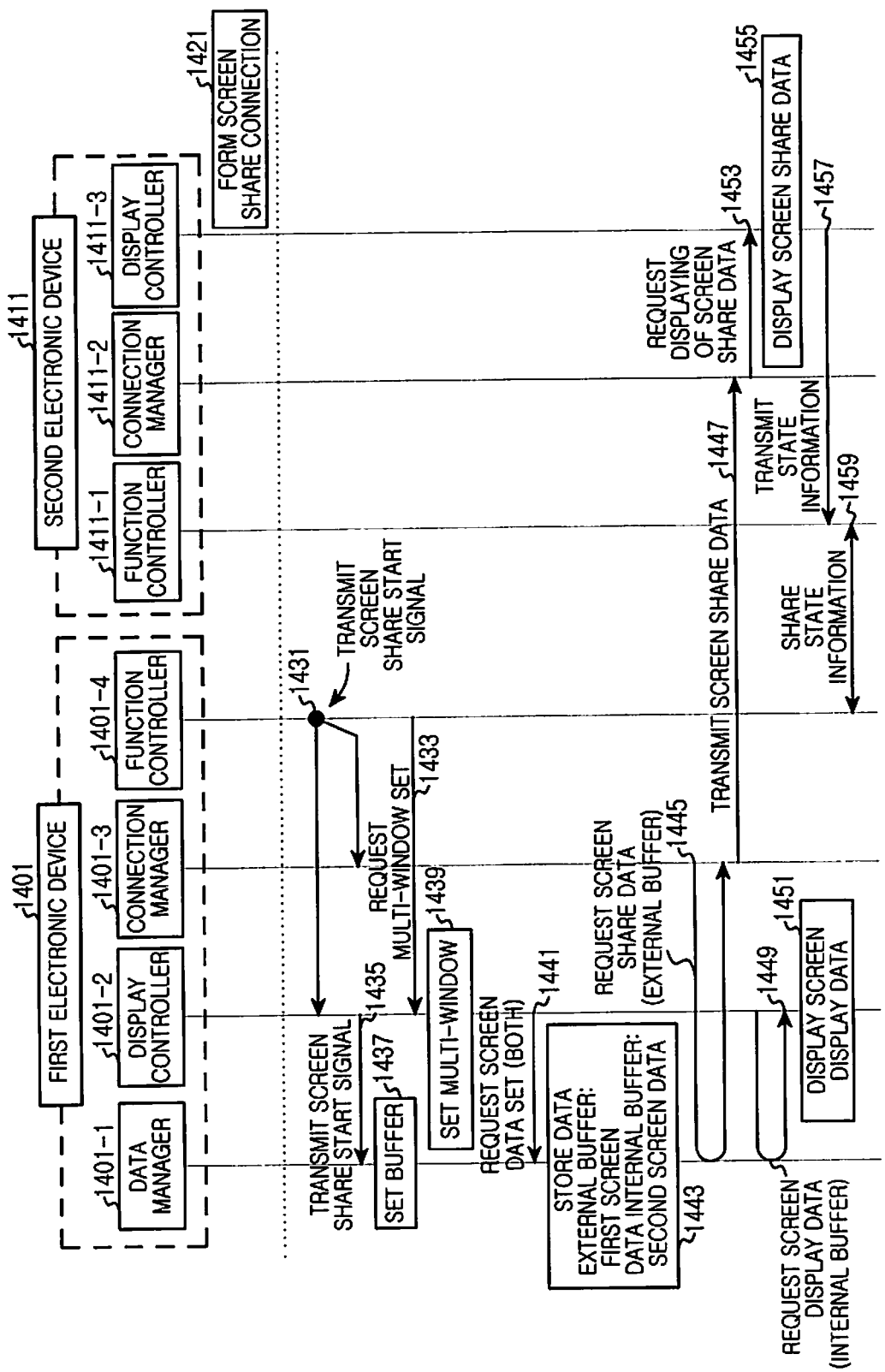
FIG. 14 is a view illustrating a flow for transmitting screen sharing data to a counterpart electronic device in an electronic device according to an embodiment of the present disclosure.

FIG. 14 illustrates a flow for transmitting screen sharing data to a counterpart electronic device in an electronic device according to an embodiment of the present disclosure.

Referring to FIG. 14, in the case where screen sharing connection is formed between a first electronic device 1401 and a second electronic device 1411 in step 1421, a function controller 1401-4 of the first electronic device 1401 transmits a screen share start signal to a display controller 1401-2 and a connection manager 1401-3 in step 1431. At this point, the function controller 1401-4 requests the display controller 1401-2 to set a multi-window in step 1433.

The display controller 1401-2 that has received a screen share start signal transmits a screen share start signal to a data manager 1401-1 in step 1435. At this point, the data manager 1401-1 sets a buffer for storing screen data in step 1437.

The display controller 1401-2 that has been requested to set the multi-window determines a window state and sets a multi-window function when needed in step 1439. Also, the display controller 1401-2 determines an electronic device which is to display screen data in step 1441. At this point, the display controller 1401-2 requests the data manager 1401-1 to store data in both an external buffer and an internal buffer in step 1443. Accordingly, the data manager 1401-1 stores first screen data to transmit to the second electronic device 1441 in the external buffer, and stores second screen data to display on the first electronic device in the internal buffer.

The connection manager 1401-3 that has received the screen share start signal requests the data manager 1401-1 to transmit screen share data to transmit to the second electronic device 1411 in step 1445. At this point, the data manager 1401-1 transmits the first screen data stored in the external buffer to the connection manager 1401-3, and the connection manager 1401-3 transmits the screen share data to a connection manager 1411-2 of the second electronic device 1411 in step 1447. Also, the display controller 1401-2 requests the data manager 1401-1 to transmit screen display data to display on the screen in step 1449. After that, the display controller 1401-2 displays screen display data in step 1451.

The connection manager 1411-2 of the second electronic device 1411 that has received the screen share data from the connection manager 1401-3 of the first electronic device 1401 requests the display controller 1411-3 to display the screen share data in step 1453. Accordingly, the display controller 1411-3 displays the screen share data in step 1455.

In case of displaying the screen share data, the display controller 1411-3 transmits state information to the function controller 1411-1 in step 1457, and the function controller 1411-1 shares the state information of the display controller 1411-3 with the function controller 1401-4 of the first electronic device 1401 to adjust synchronization of the screen share data in step 1459.

Figure 15A:
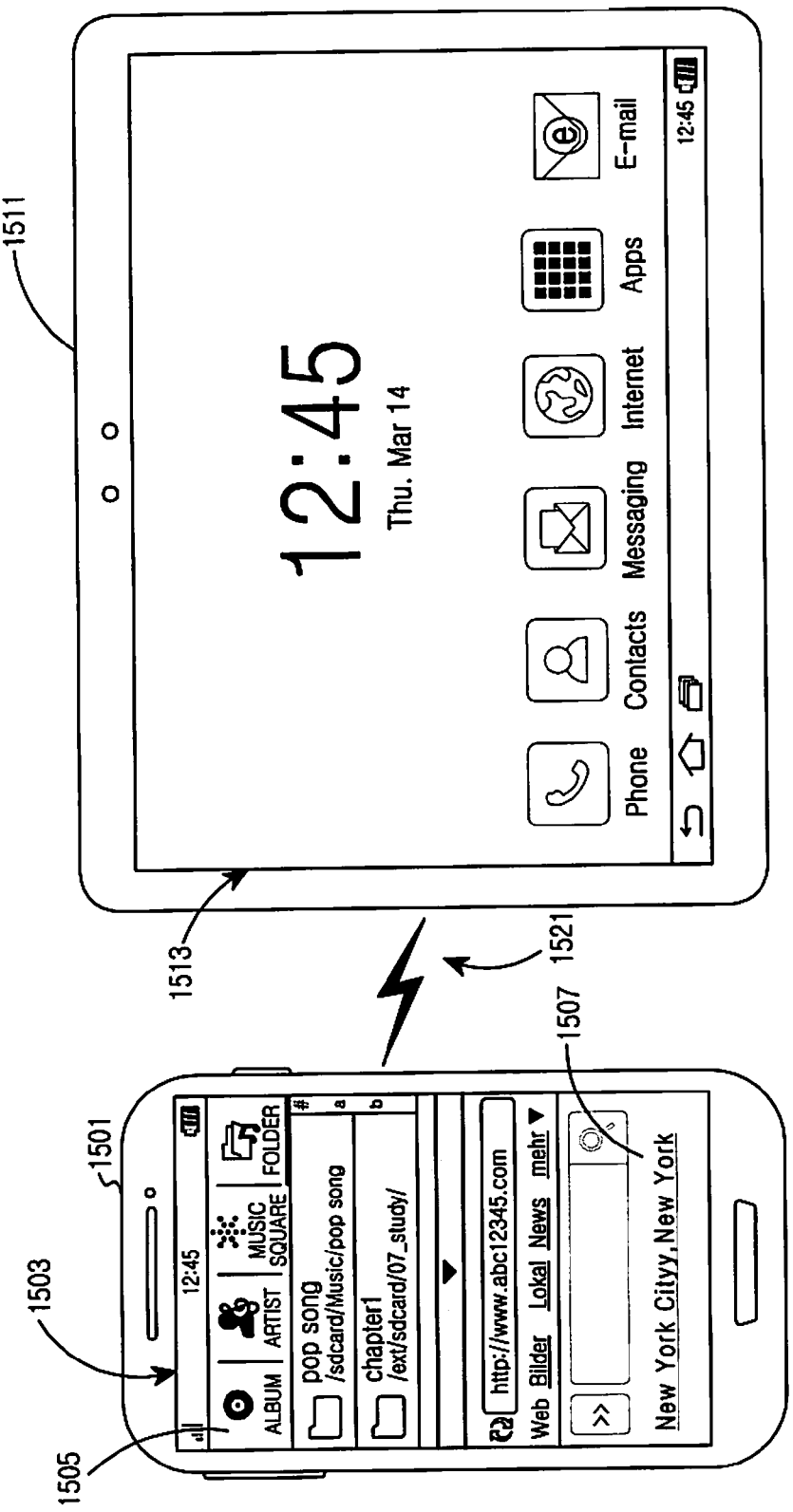
FIGS. 15A and 15B are views illustrating screen configurations for transmitting screen sharing data to a counterpart electronic device in an electronic device according to an embodiment of the present disclosure.
Figure 15B:
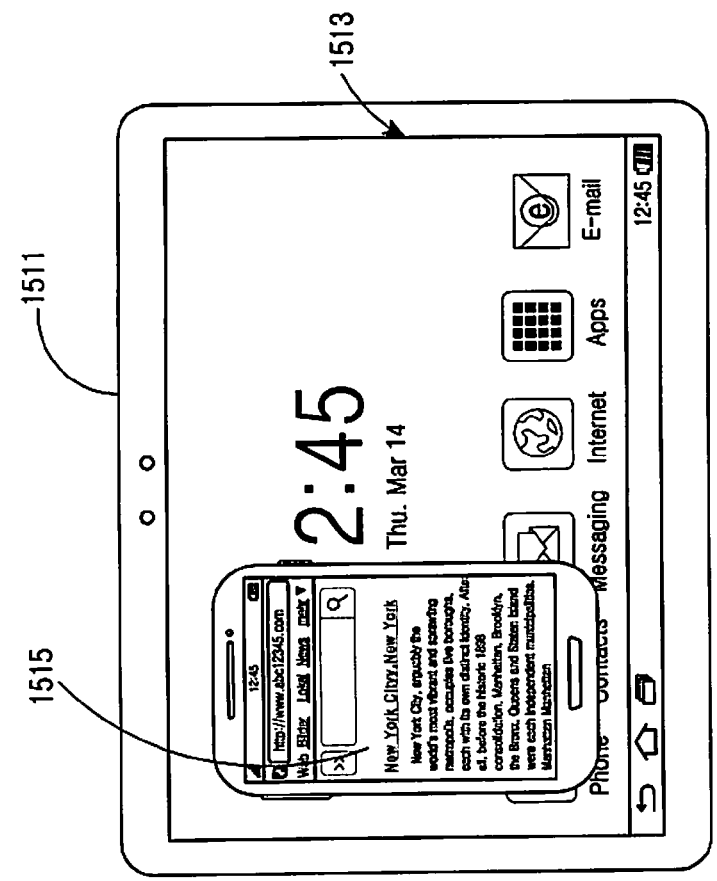
Figure 15B:
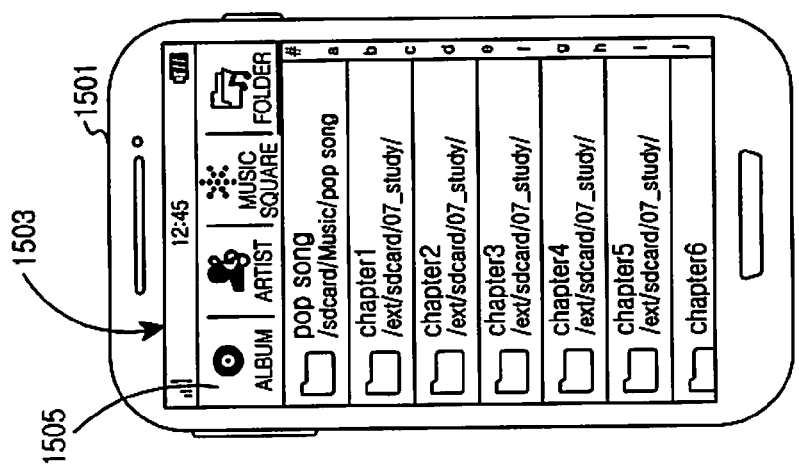

For example, as illustrated in FIG. 15A, when a screen share connection is formed between a first electronic device 1501 and a second electronic device 1511 as indicated by reference number 1521, the first electronic device 1501 that has received a screen share start signal sets a buffer for storing screen data. At this point, the first electronic device 1501 determines to store data to transmit to the second electronic device 1511 in the external buffer, and stores data to display on the first electronic device 1501 in the internal buffer. For example, the first electronic device 1501 may store screen data of an Internet browser 1507 in the external buffer, and store screen data of a music player 1505 in the internal buffer. After that, as illustrated in FIG. 15B, the first electronic device 1501 displays the music player 1505 stored in the internal buffer on a display unit 1503, and displays an Internet browser 1515 transmitted from the first electronic device 1501 on a display unit 1513. The first electronic device 1501 and the second electronic device 1511 share state information with each other to adjust synchronization of screen share data as indicated by reference number 1521.

Figure 16:
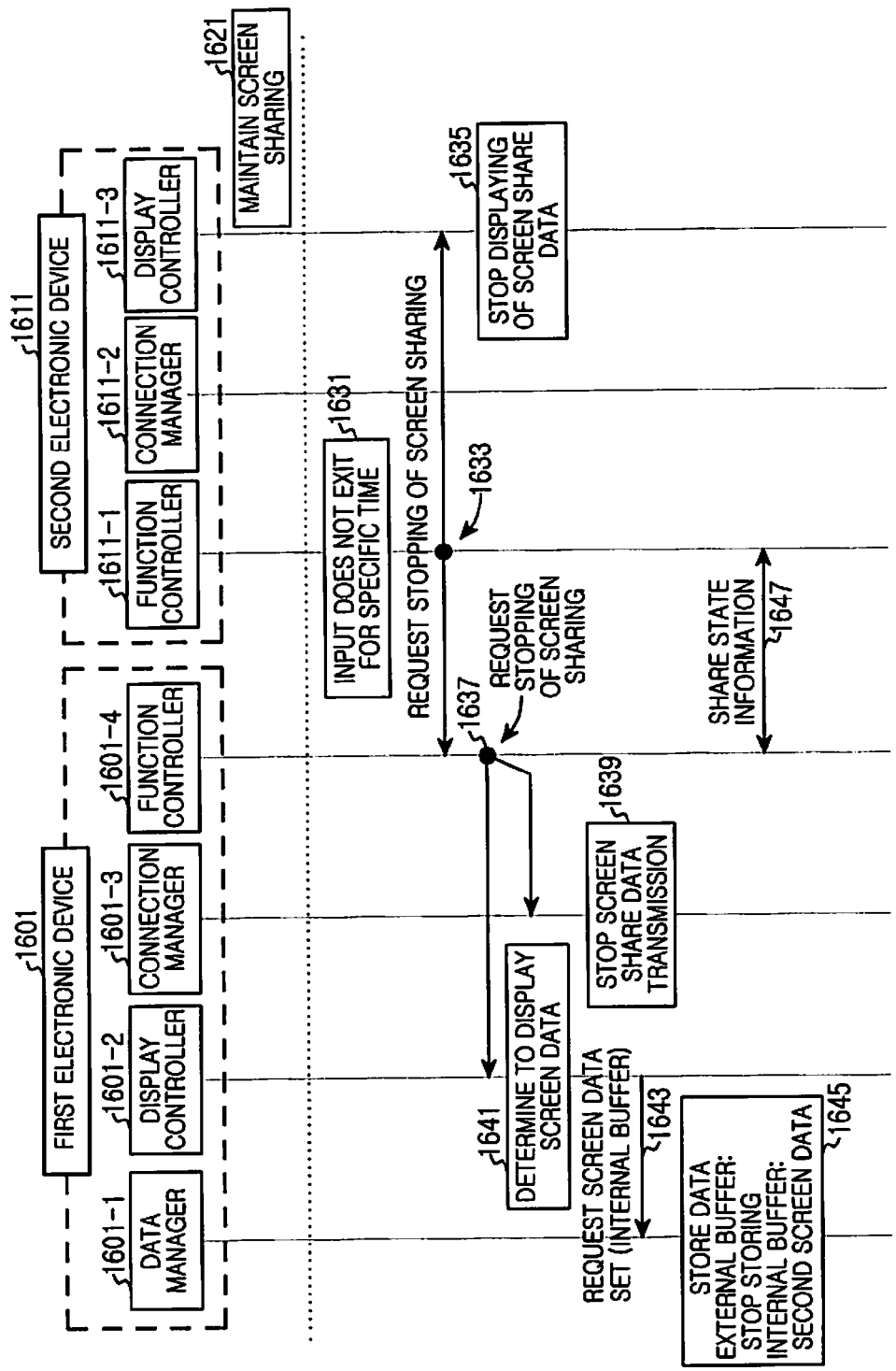
FIG. 16 is a view illustrating a flow for stopping screen sharing data transmission based on state information of each electronic device in an electronic device according to an embodiment of the present disclosure.

FIG. 16 illustrates a flow for stopping screen sharing data transmission based on state information of each electronic device in an electronic device according to an embodiment of the present disclosure.

Referring to FIG. 16, while a screen is shared between a first electronic device 1601 and a second electronic device 1611 in step 1621, a function controller 1611-1 of the second electronic device 1611 determines whether a user's input exists for a specific time. When determining the user's input does not exist for a specific time in step 1631, the function controller 1611-1 requests a display controller 1611-3 and a function controller 1601-4 of the first electronic device 1601 to stop screen sharing in step 1633.

The display controller 1611-3 of the second electronic device 1611 that has been requested to stop screen sharing stops displaying of screen share data in step 1635.

Also, the function controller 1601-4 of the first electronic device 1601 that has been requested to stop screen sharing requests a display controller 1601-2 and a connection manager 1601-3 to stop screen sharing in step 1637. At this point, the connection manager 1601-3 stops transmission of screen data to the second electronic device 1611 in step 1639. Also, the display controller 1601-2 determines an electronic device which is to display screen data in step 1641. At this point, the display controller 1601-2 requests a data manager 1601-1 to stop storing data in an external buffer, and to continue to store second screen data in an internal buffer in step 1643. Accordingly, the data manager 1601-1 stops storing data in the external buffer and stores the second screen data in the internal buffer in step 1645.

The function controller 1611-1 of the second electronic device 1611 and the function controller 1601-4 of the first electronic device share state information with each other to adjust synchronization in step 1647.

Figure 17:
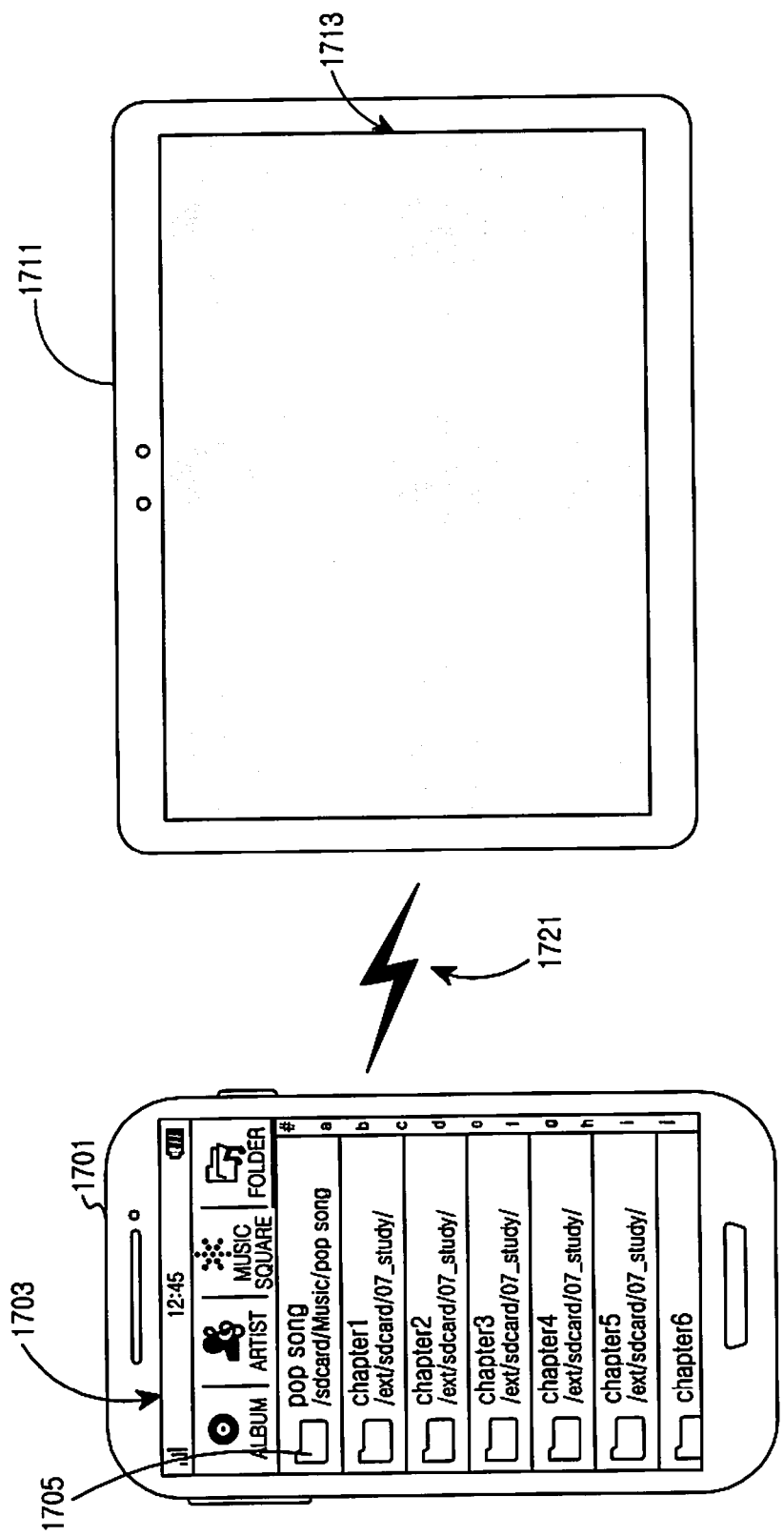
FIG. 17 is a view illustrating screen configuration for stopping screen sharing data transmission based on state information of each electronic device in an electronic device according to an embodiment of the present disclosure.

For example, as illustrated in FIG. 15B, while a screen is shared between the first electronic device 1501 and the second electronic device 1511 as indicated by reference number 1521, the second electronic device 1511 determines whether a user's input exists for a specific time. When determining the user's input does not exist for a specific time, the second electronic device 1511 requests the first electronic device 1501 to stop screen sharing. At this point, as illustrated in FIG. 17, the second electronic device 1711 stops displaying of screen share data. Also, the first electronic device 1701 that has been requested to stop screen sharing stops transmission of screen data to the second electronic device 1711. At this point, the first electronic device 1701 stops storing data in an external buffer, and continues to store data in an internal buffer. The first electronic device 1701 stops encoding of data to transmit to the second electronic device 1711. Accordingly, the first electronic device 1701 continues to display screen data stored in the internal buffer as indicated by reference number 1705. The first electronic device 1701 and the second electronic device 1711 share state information with each other to adjust synchronization of screen share data as indicated by reference number 1721.

Figure 18:
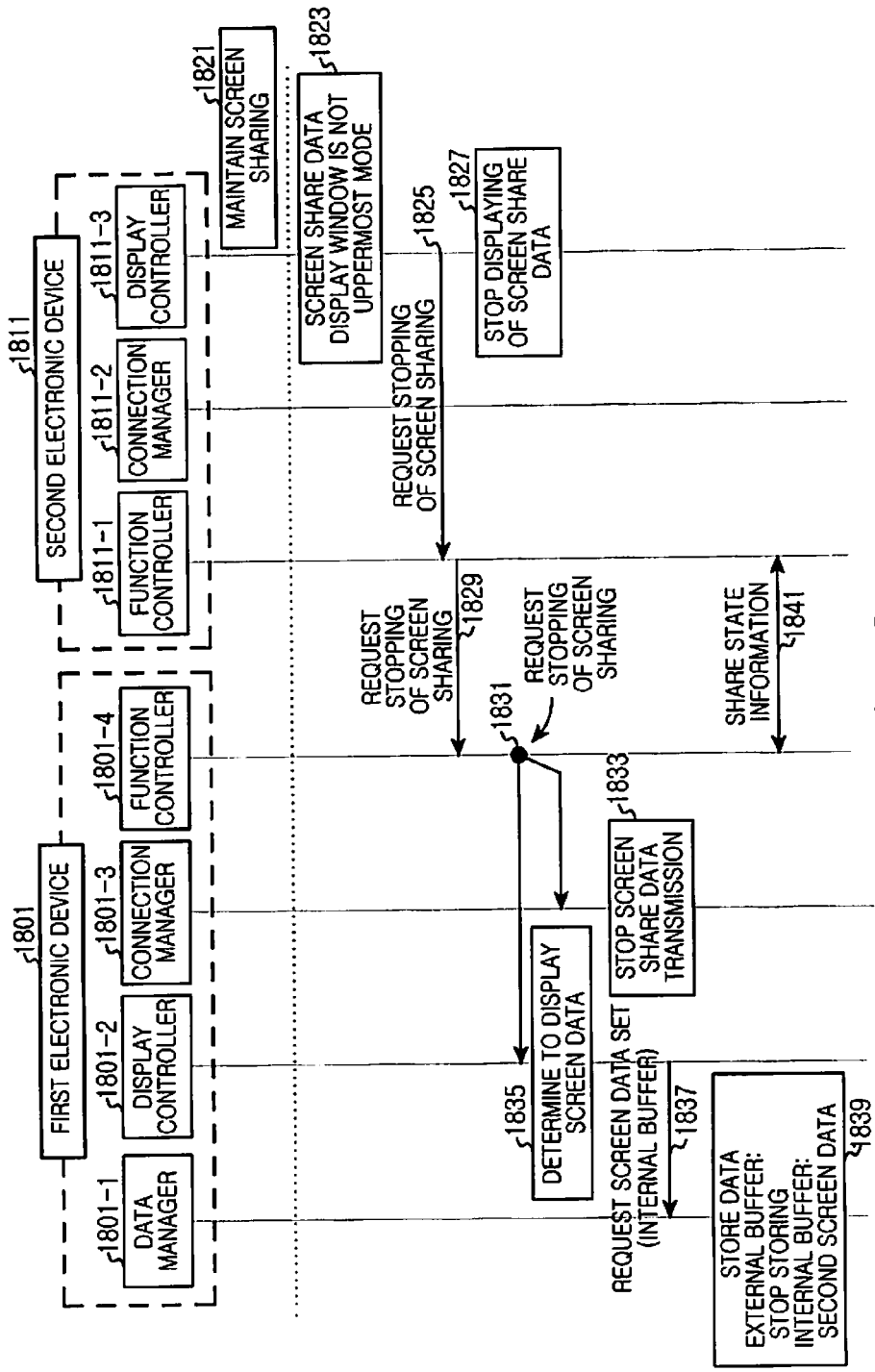
FIG. 18 is a view illustrating a flow for stopping screen sharing data transmission based on state information of each electronic device in an electronic device according to an embodiment of the present disclosure.

FIG. 18 illustrates a flow for stopping screen sharing data transmission based on state information of each electronic device in an electronic device according to an embodiment of the present disclosure.

Referring to FIG. 18, while a screen is shared between a first electronic device 1801 and a second electronic device 1811 in step 1821, a display controller 1811-3 of the second electronic device 1811 determines whether a display window of screen share data is an uppermost mode.

In the case where the screen share data display window is not the uppermost mode in step 1823, the display controller 1811-3 requests a function controller 1811-1 to stop screen sharing in step 1825. At this point, the display controller 1811-3 stops displaying of screen share data in step 1827. Also, the function controller 1811-1 requests a function controller 1801-4 of the first electronic device 1801 to stop screen sharing in step 1829.

The function controller 1801-4 of the first electronic device 1801 that has been requested to stop screen sharing requests a display controller 1801-2 and a connection manager 1801-3 to stop screen sharing in step 1831. At this point, the connection manager 1801-3 stops transmission of screen data to the second electronic device 1811 in step 1833. Also, the display controller 1801-2 determines an electronic device which is to display screen data in step 1835. At this point, the display controller 1801-2 requests the data manager 1801-1 to stop storing data in an external buffer, and to continue to store second screen data in an internal buffer in step 1837. Accordingly, the data manager 1801-1 stops storing data in the external buffer, and stores the second screen data in the internal buffer in step 1839.

The function controller 1811-1 of the second electronic device 1811 and the function controller 1801-4 of the first electronic device 1801 share state information with each other to adjust synchronization in step 1841.

Figure 19A:
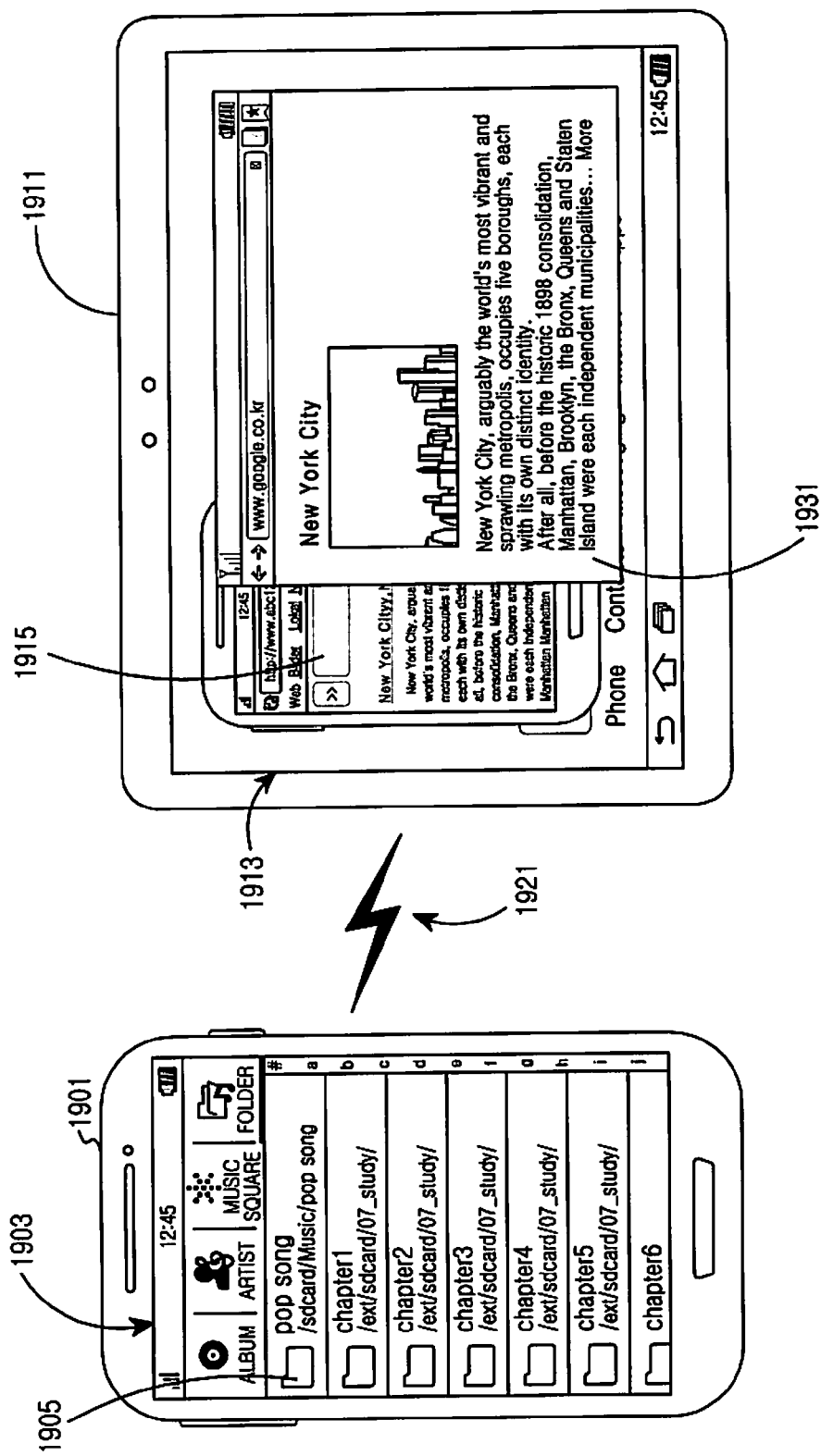
FIGS. 19A and 19B are views illustrating screen configurations for stopping screen sharing data transmission based on state information of each electronic device in an electronic device according to an embodiment of the present disclosure.

For example, as illustrated in FIG. 19A, while a screen is shared as indicated by reference number 1921 between a first electronic device 1901 and a second electronic device 1911, in the case where a screen share data display window 1915 is hidden as indicated by reference number 1931 by a specific portion or more due to execution of an application in the second electronic device 1911, the second electronic device 1911 requests the first electronic device 1901 to stop screen sharing. At this point, the second electronic device 1911 stops displaying of screen share data. Also, the first electronic device 1901 that has been requested to stop screen sharing stops transmission of screen data to the second electronic device 1911. At this point, the first electronic device 1901 stops storing data in an external buffer, and continues to store data in an internal buffer. The first electronic device 1901 stops encoding of data to transmit to the second electronic device 1911. The first electronic device 1901 and the second electronic device 1911 share state information with each other to adjust synchronization of screen share data as indicated by reference number 1921.

Figure 19B:
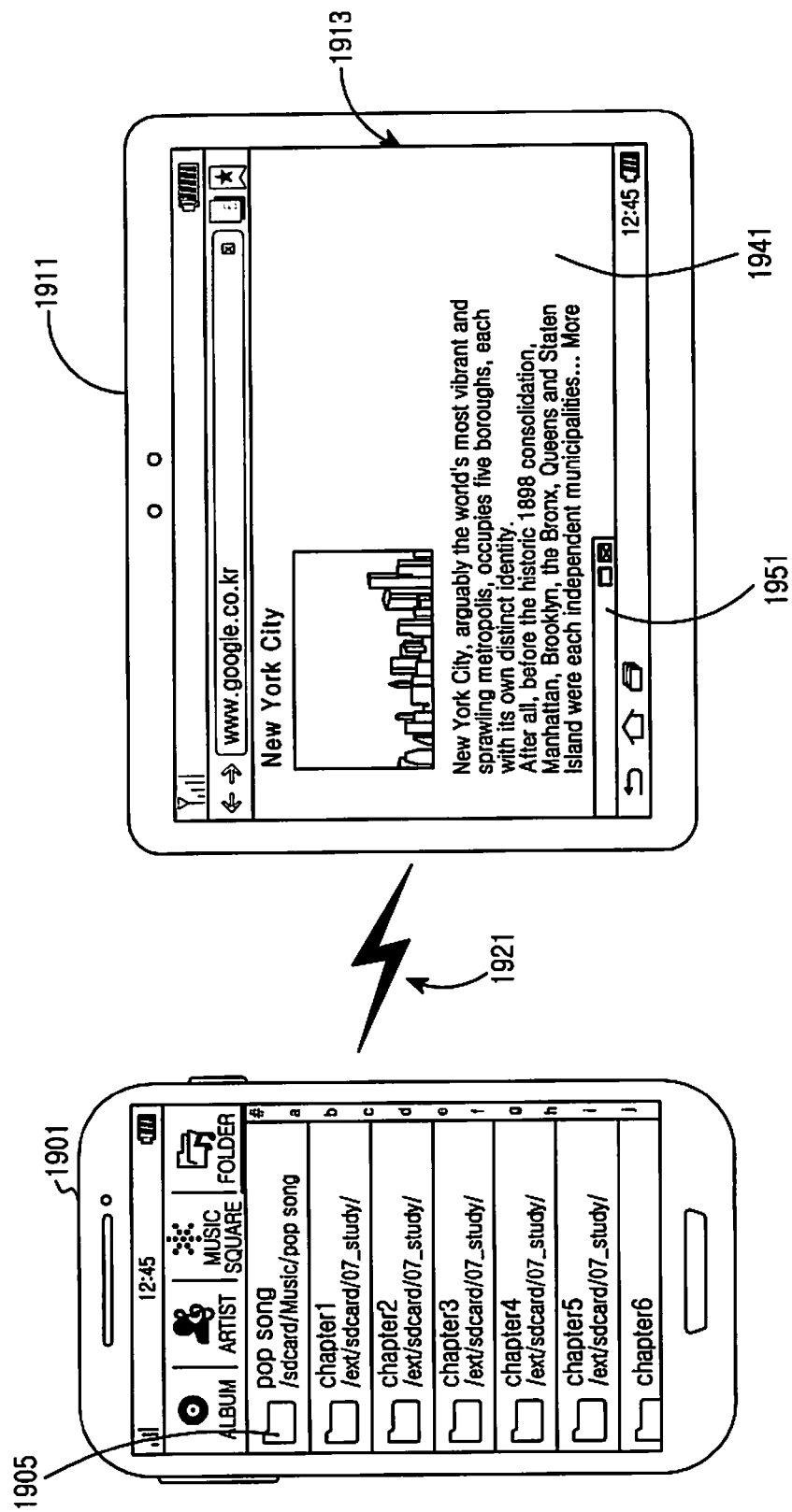

For another example, as illustrated in FIG. 19B, while a screen is shared as indicated by reference number 1921 between the first electronic device 1901 and the second electronic device 1911, in the case where the screen share data display window is switched to a minimize state as indicated by reference number 1951 due to execution of an application in the second electronic device 1911, the second electronic device 1911 requests the first electronic device 1901 to stop screen sharing. At this point, the second electronic device 1911 stops displaying of screen share data. Also, the first electronic device 1901 that has been requested to stop screen sharing requests the second electronic device 1911 to stop transmission of screen data. At this point, the first electronic device 1901 stops storing data in an external buffer, and continues to store data in an internal buffer. The first electronic device 1901 stops encoding of data to transmit to the second electronic device 1911. The first electronic device 1901 and the second electronic device 1911 share state information with each other to adjust synchronization of screen share data as indicated by reference number 1921.

Additionally, in the case where the first electronic device performs screen sharing with the second electronic device, the first electronic device may transmit a notice that occurs in the first electronic device to the second electronic device to allow the second electronic device to display the same. At this point, the second electronic device may display the notice received from the first electronic device on the second electronic device even though screen sharing with the first electronic device is stopped.

FIGS. 20A to 23C illustrate screen configurations for transmitting screen sharing data to a counterpart electronic device in an electronic device according to an embodiment of the present disclosure.

Figure 20A:
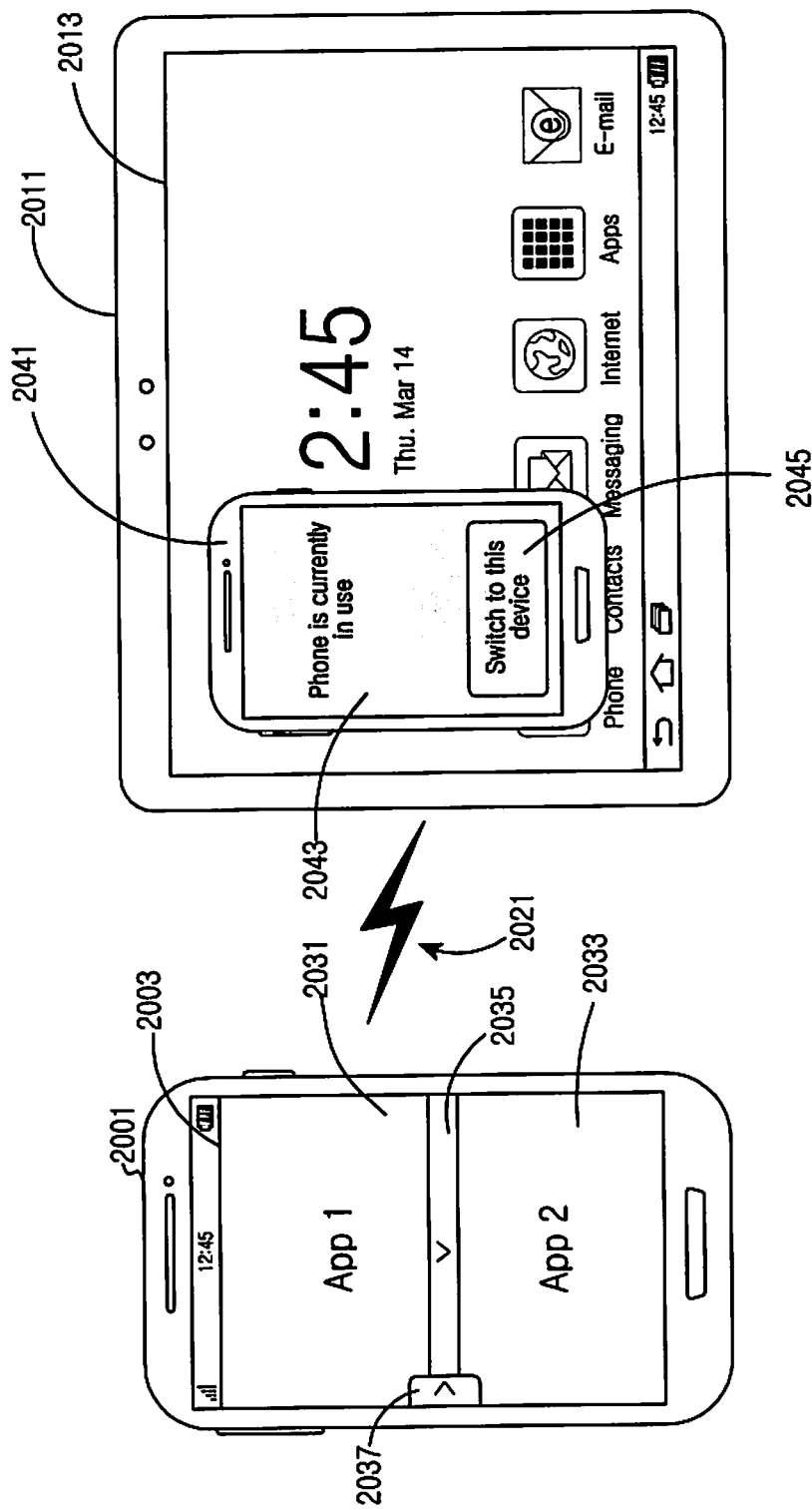
FIGS. 20A to 23C are views illustrating screen configurations for transmitting screen sharing data to a counterpart electronic device in an electronic device according to an embodiment of the present disclosure.

Referring to FIG. 20A, a first electronic device 2001 and a second electronic device 2011 assume a state where screen share connection is formed as indicated by reference number 2021. At this point, the first electronic device 2001 operates in a multi-window mode that operates a first application 2031 and a second application 2033 via a display unit 2003. A boundary bar 2035 for controlling a display region of the first application 2031 and the second application 2033, and an application list call menu 2037 may be provided. At this point, the second electronic device 2011 may include screen configuration 2041 for displaying screen share data of the first electronic device 2001 via a display unit 2013.

Figure 20B:
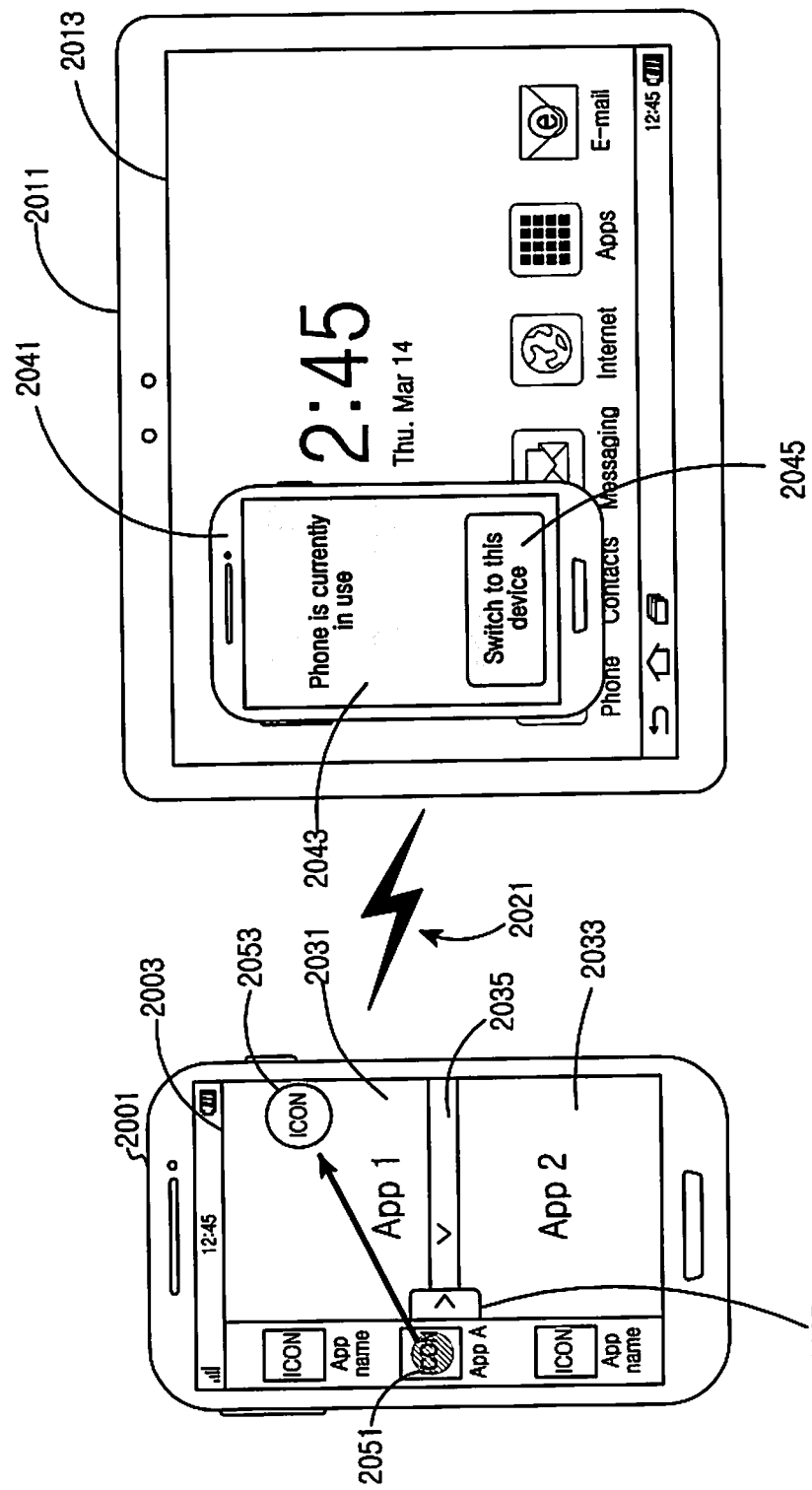

In the case where an input for the application list call menu 2037 is detected in the first electronic device 2001, the electronic device displays an application list that may operate in the multi-window mode or an application list which is to perform screen sharing on the second electronic device 2011 as illustrated in FIG. 20B. At this point, an icon 2053 that may control to perform screen sharing on the second electronic device 2011 is displayed.

Figure 20C:
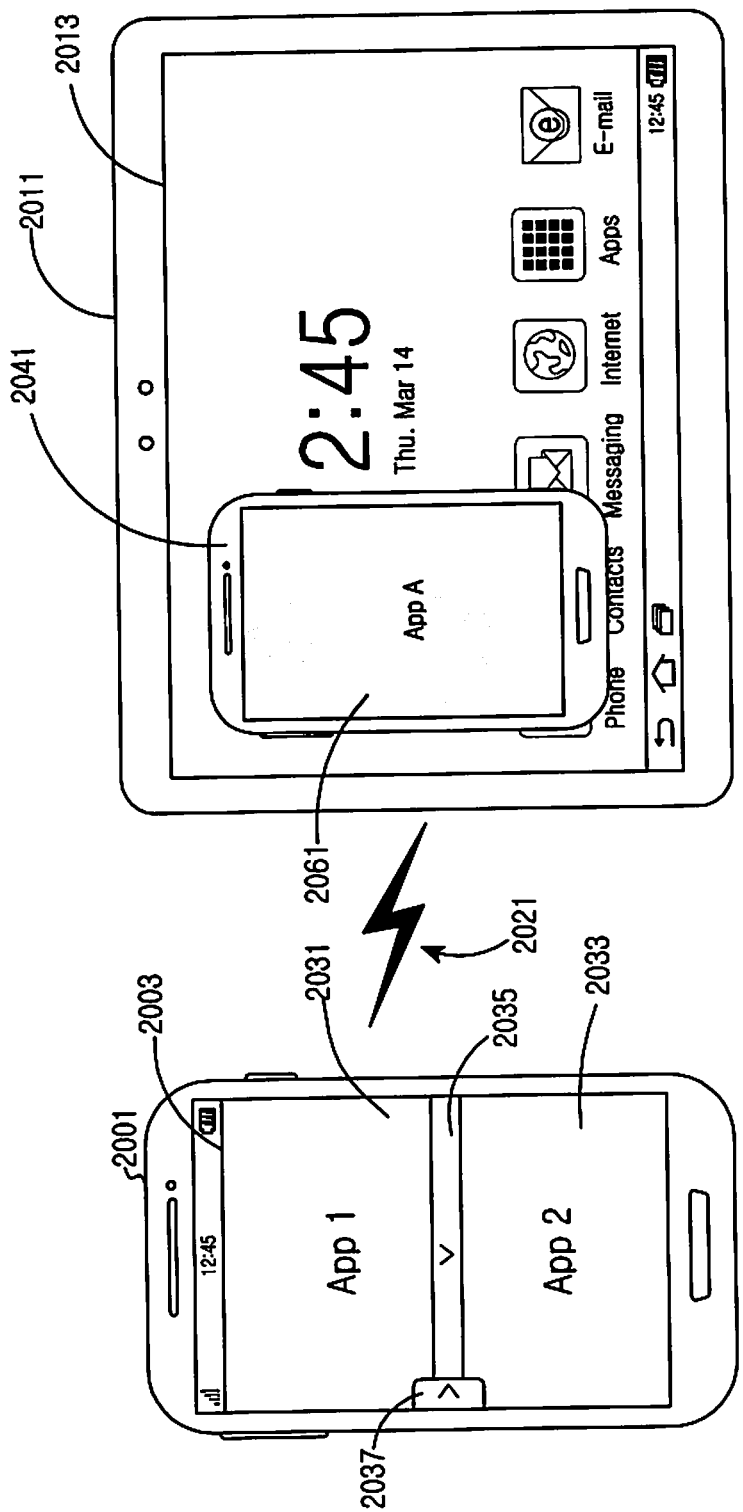

After "App A" 2051 is selected from an application list, in the case where a drag operation is performed on the icon region 2053 for controlling to perform screen sharing on the second electronic device 2011, the second electronic device 2011 displays screen share data as indicated by reference number 2061 via the display unit 2013 of the second electronic device 2011 as illustrated in FIG. 20C.

In FIGS. 20A to 20C, the first electronic device may transmit screen share data to the second electronic device while operating in the multi-window mode. Also, in FIGS. 20A to 20C, the first electronic device may transmit screen share data to the second electronic device while operating in the single window mode.

Figure 21A:
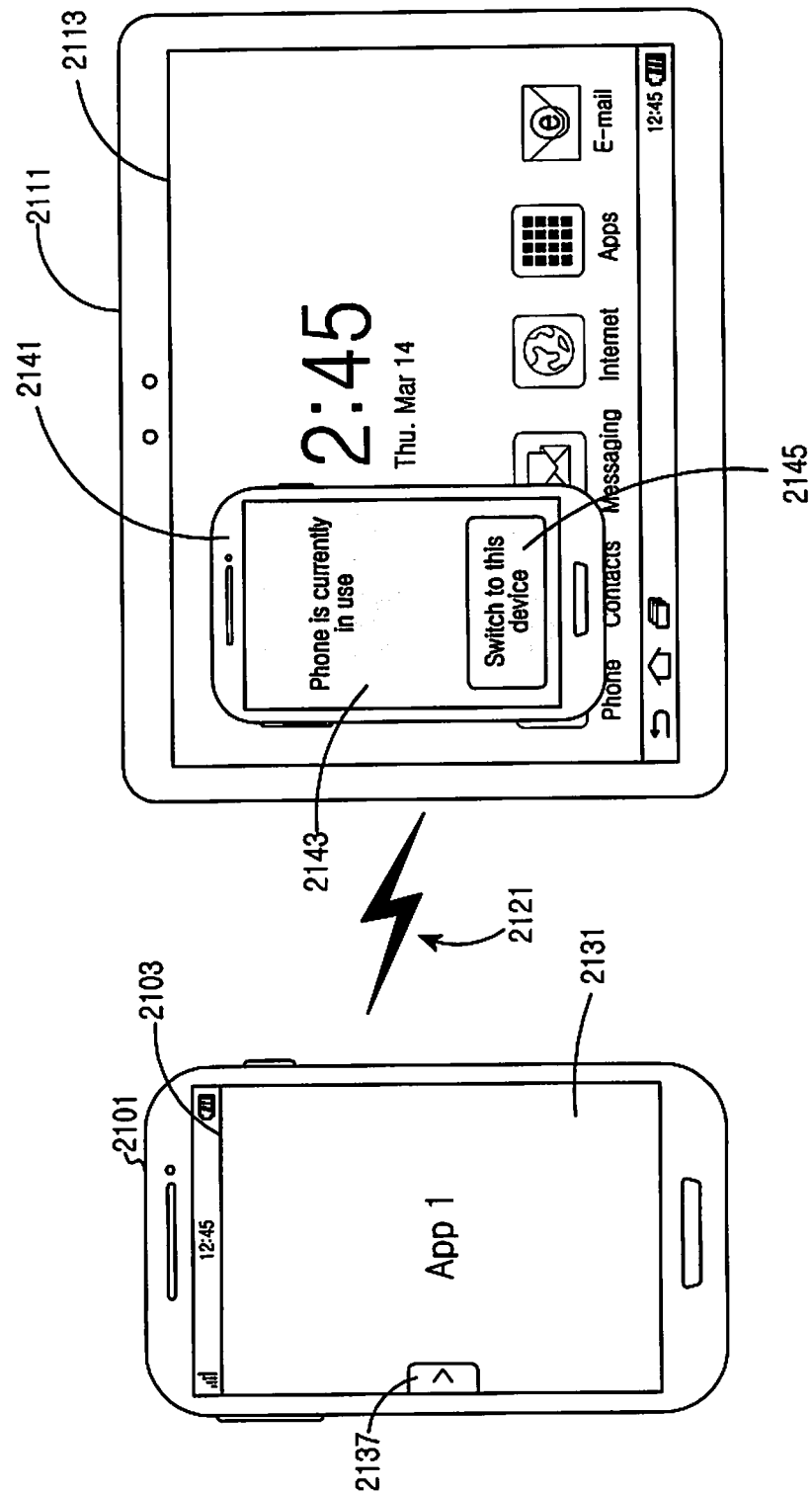

Referring to FIG. 21A, a first electronic device 2101 and a second electronic device 2111 assume a state where screen share connection is formed as indicated by reference number 2121. At this point, the first electronic device 2101 may operate in the single window mode that operates a first application 2131 via a display unit 2103. The first electronic device 2101 includes an application list call menu 2137. The second electronic device 2111 includes the screen configuration 2141 for displaying screen share data of the first electronic device 2001 via the display unit 2113.

Figure 21B:
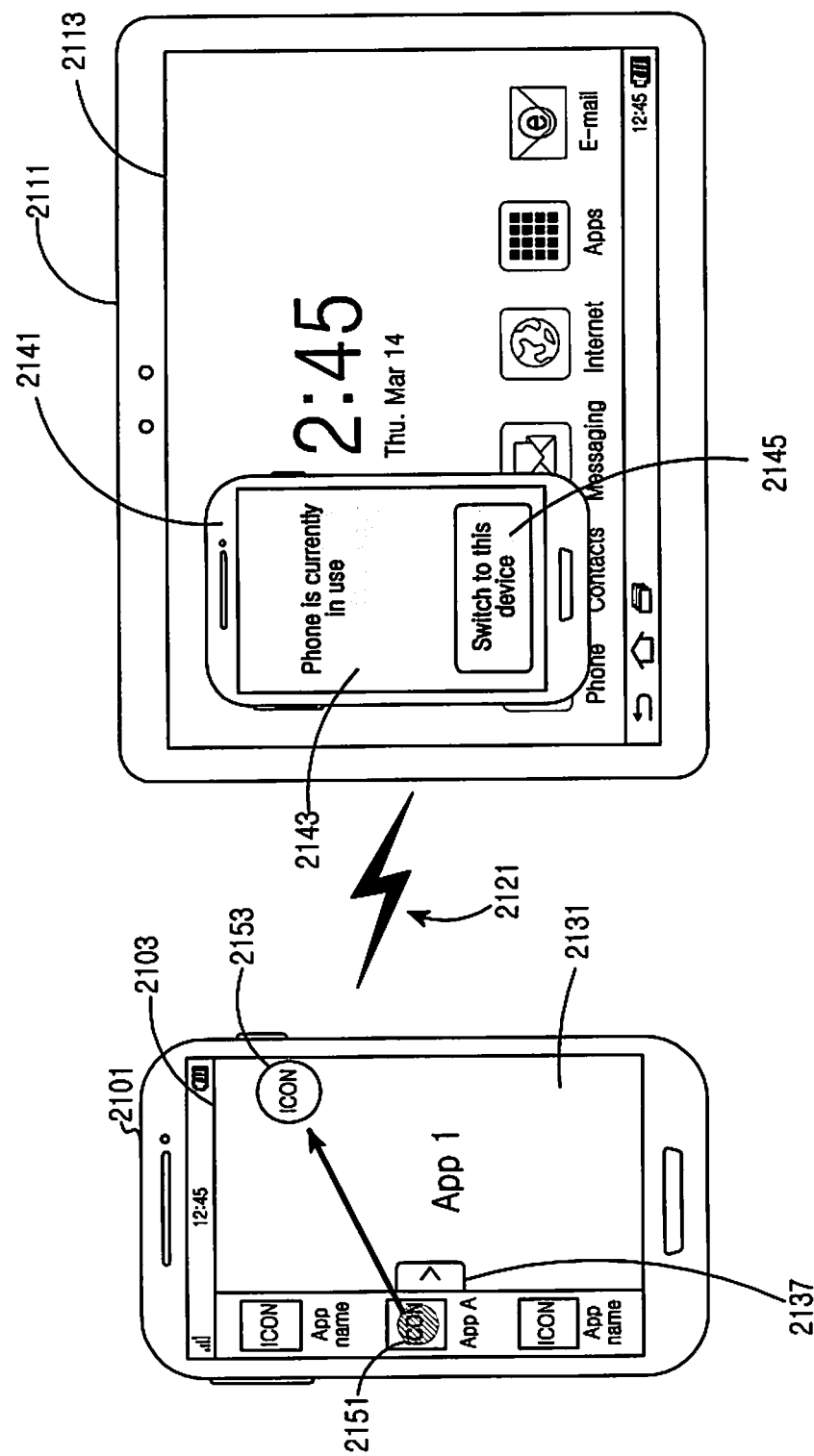
Figure 21C:
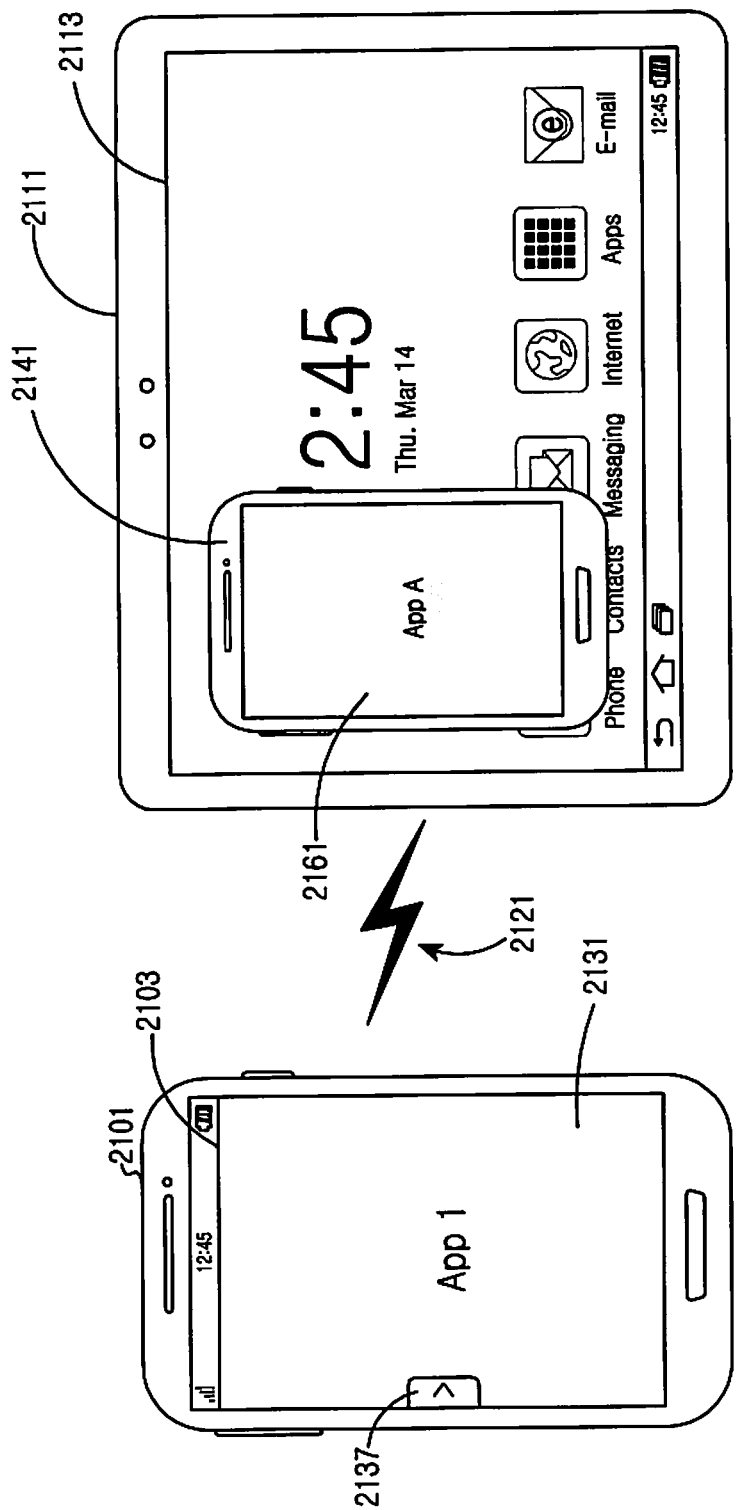

In the case where an input for the application list call menu 2137 is detected in the first electronic device 2101, the electronic device displays an application list that may operate in the multi-window mode or an application list for performing screen sharing on the second electronic device 2111 as illustrated in FIG. 21B. At this point, an icon 2153 for controlling to perform screen sharing on the second electronic device 2111 is displayed.

After "App A" 2151 is selected from an application list, in the case where a drag operation is performed on the icon region 2153 for controlling to perform screen sharing on the second electronic device 2111, the electronic device displays screen share data as indicated by reference number 2161 via the display unit 2113 of the second electronic device 2111 as illustrated in FIG. 20C.

In FIGS. 20A to 21C, the first electronic device may transmit screen share data to the second electronic device. In FIGS. 22A to 23C below, the first electronic device may stop transmission of screen share data to the second electronic device.

Figure 22A:
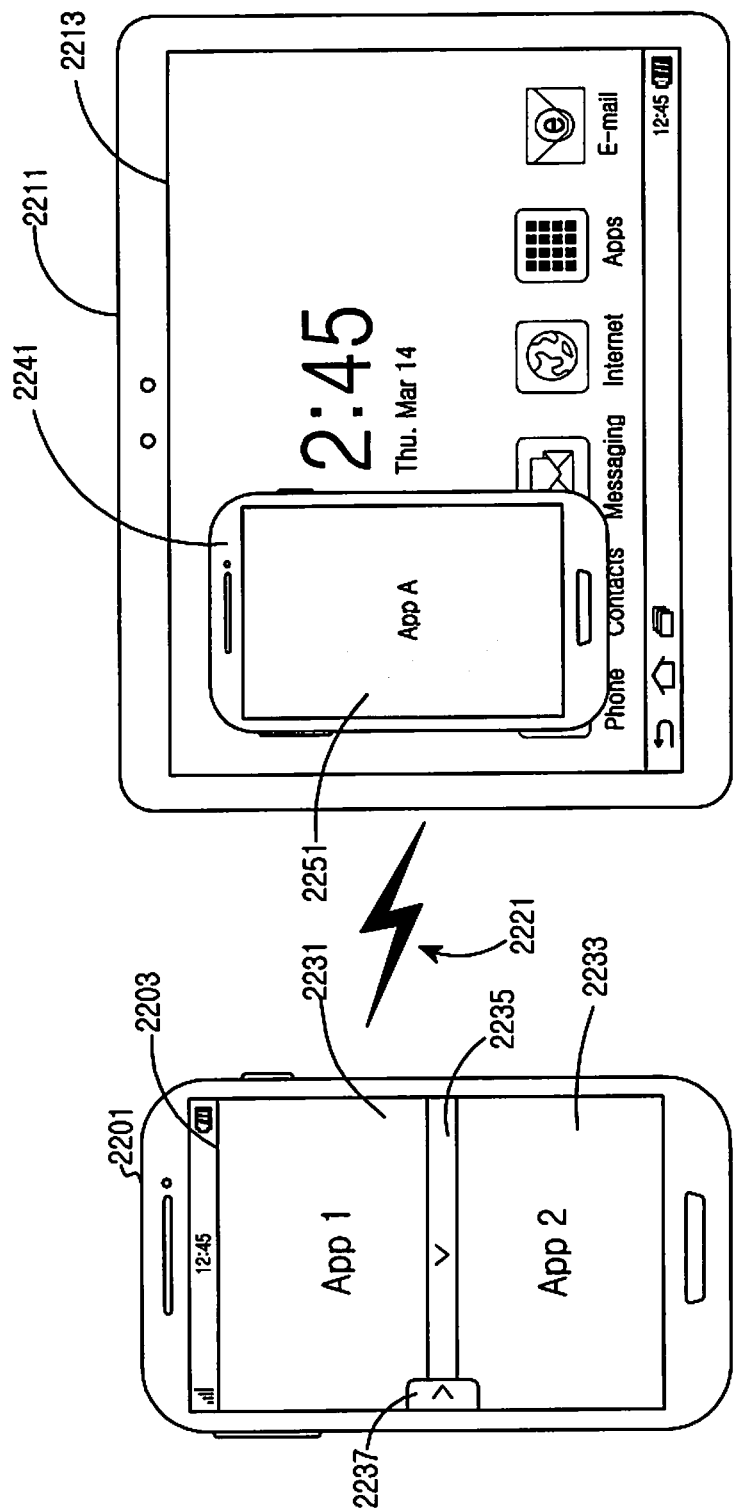

Referring to FIG. 22A, a screen share connection is formed between a first electronic device 2201 and a second electronic device 2211, and also the first electronic device 2201 is transmitting screen share data to the second electronic device 2211 as indicated by reference number 2221. At this point, the first electronic device 2201 may be operating in the multi-window mode that operates a first application 2231 and a second application 2233. A boundary bar 2235 for controlling a display region of the first application 2231 and the second application 2233, and an application list call menu 2237 may be provided. At this point, the second electronic device 2211 displays screen share data received from the first electronic device 2201 via the display unit 2213 as indicated by reference number 2251.

Figure 22B:
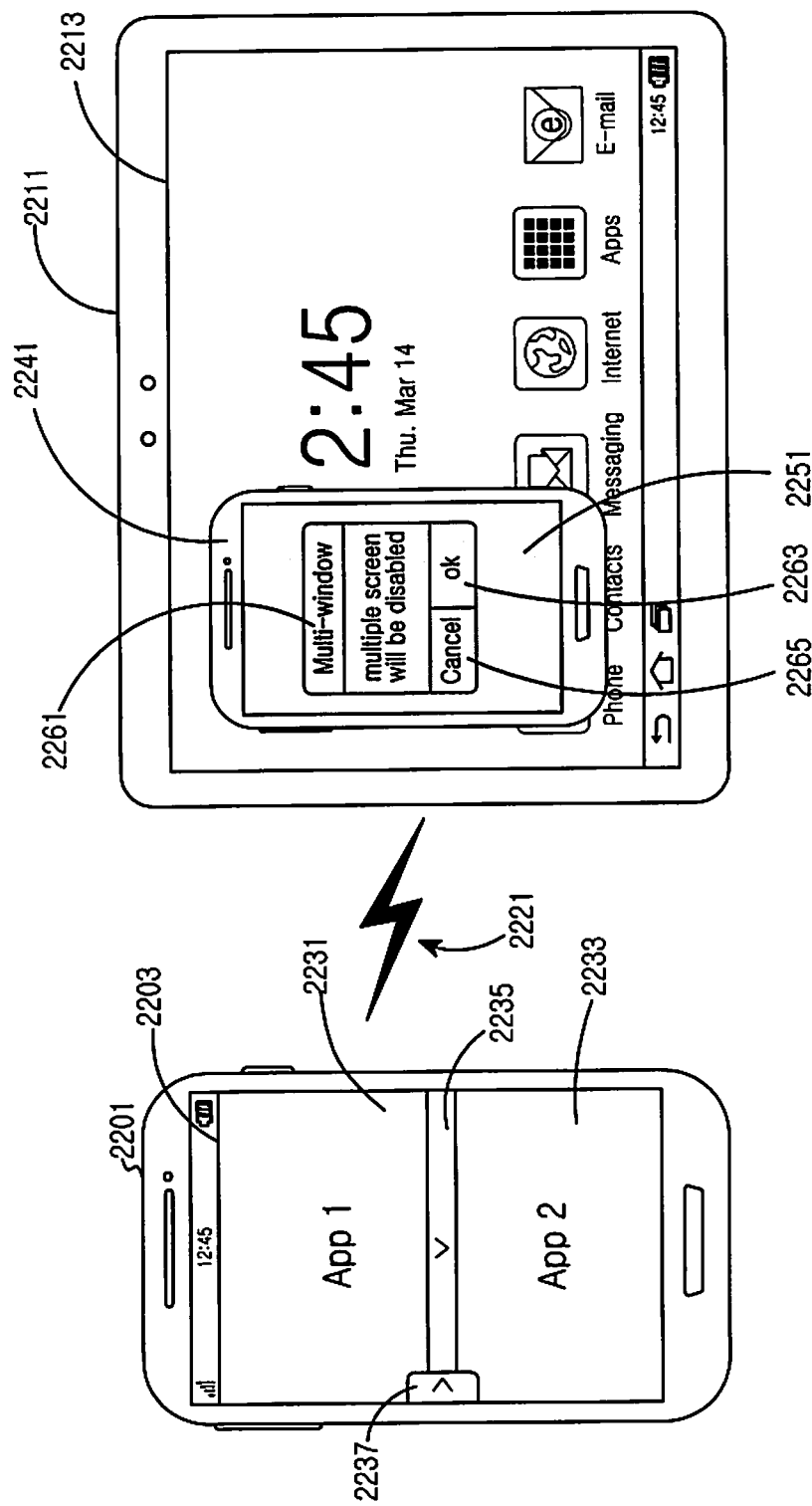

In the case where the second electronic device 2211 generates an event in order to stop displaying of screen share data at a point where the second electronic device 2211 controls screen configuration 2241 displaying screen share data, the second electronic device 2211 displays a popup window 2261 for determining whether to stop displaying of screen share data as illustrated in FIG. 22B.

Figure 22C:
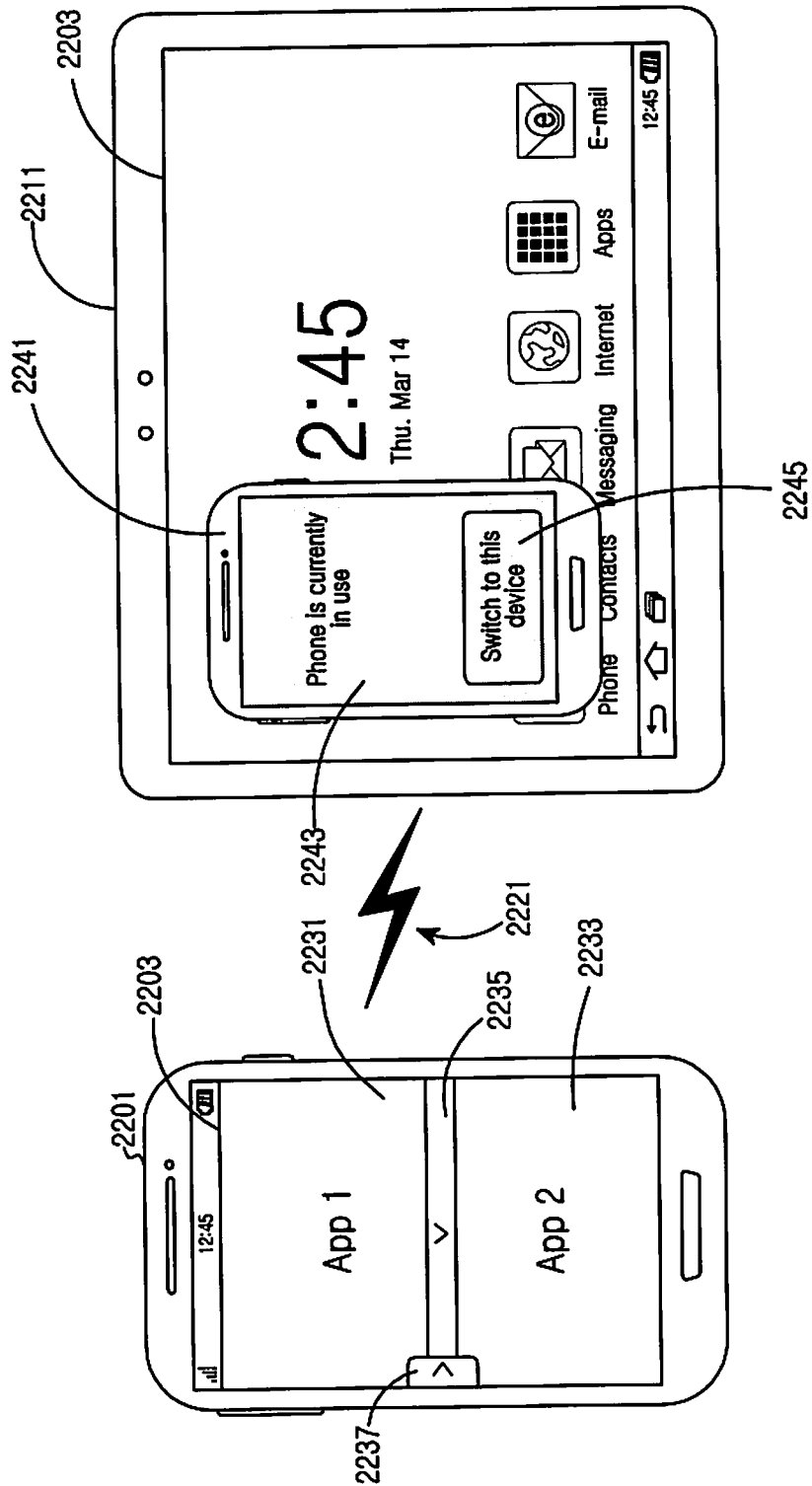

In the case where "OK" 2263 is selected in the popup window 2261, the first electronic device 2201 stops transmission of screen share data to the second electronic device 2211, and the second electronic device 2211 stops displaying of screen share data as illustrated in FIG. 22C as indicated by reference number 2243.

In FIGS. 22A to 22C, the first electronic device stops transmission of screen share data to the second electronic device while operating in the multi-window mode. Also, in FIGS. 23A to 23C, the first electronic device stops transmission of screen share data to the second electronic device while operating in the single window mode.

Figure 23A:
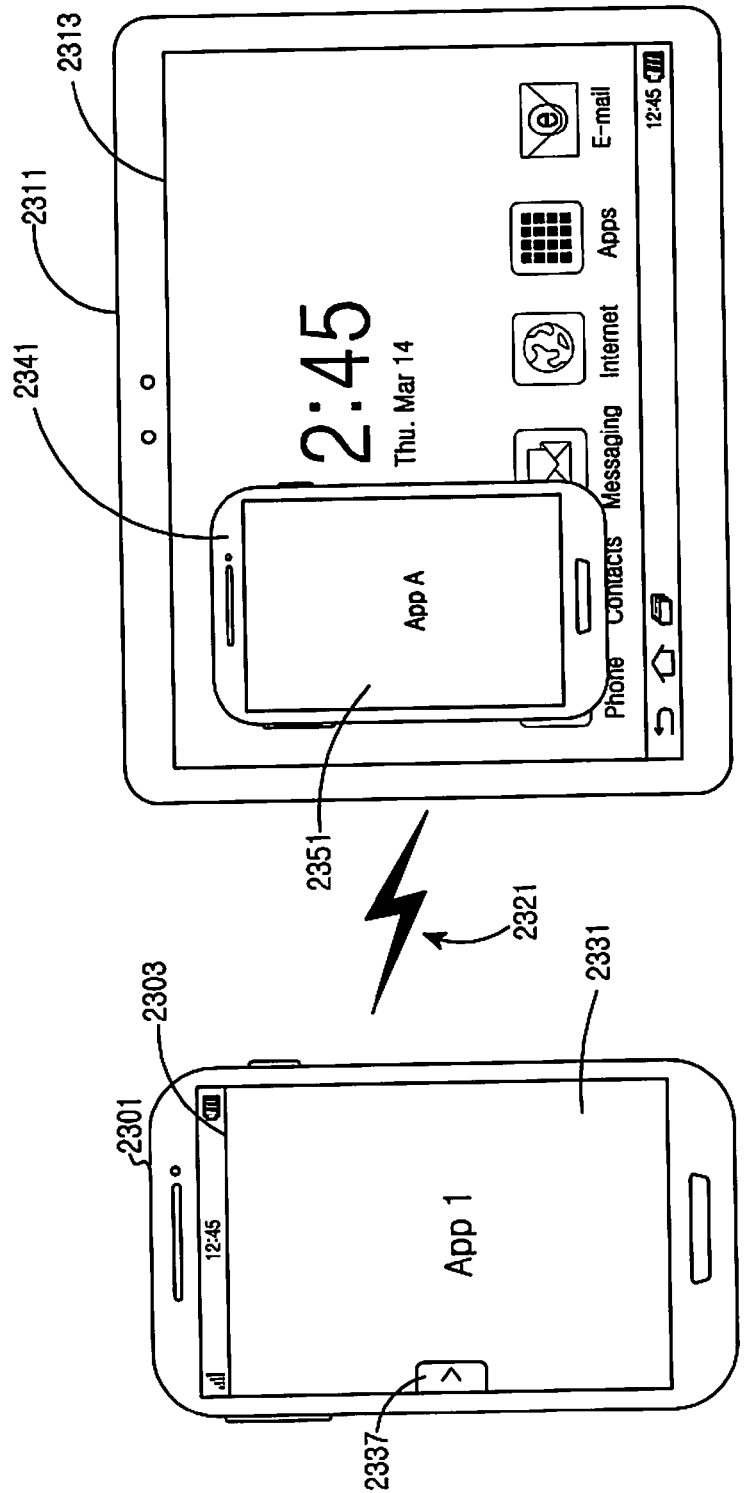

Referring to FIG. 23A, a screen share connection is formed between a first electronic device 2301 and a second electronic device 2311, and also the first electronic device 2301 is transmitting screen share data to the second electronic device 2311 as indicated by reference number 2321. At this point, the first electronic device 2301 is operating in the single window mode that operates a first application 2331 via a display unit 2303, and includes an application list call menu 2337. The second electronic device 2311 is displaying screen share data received from the first electronic device 2301 via the display unit 2313 as indicated by reference number 2351.

Figure 23B:
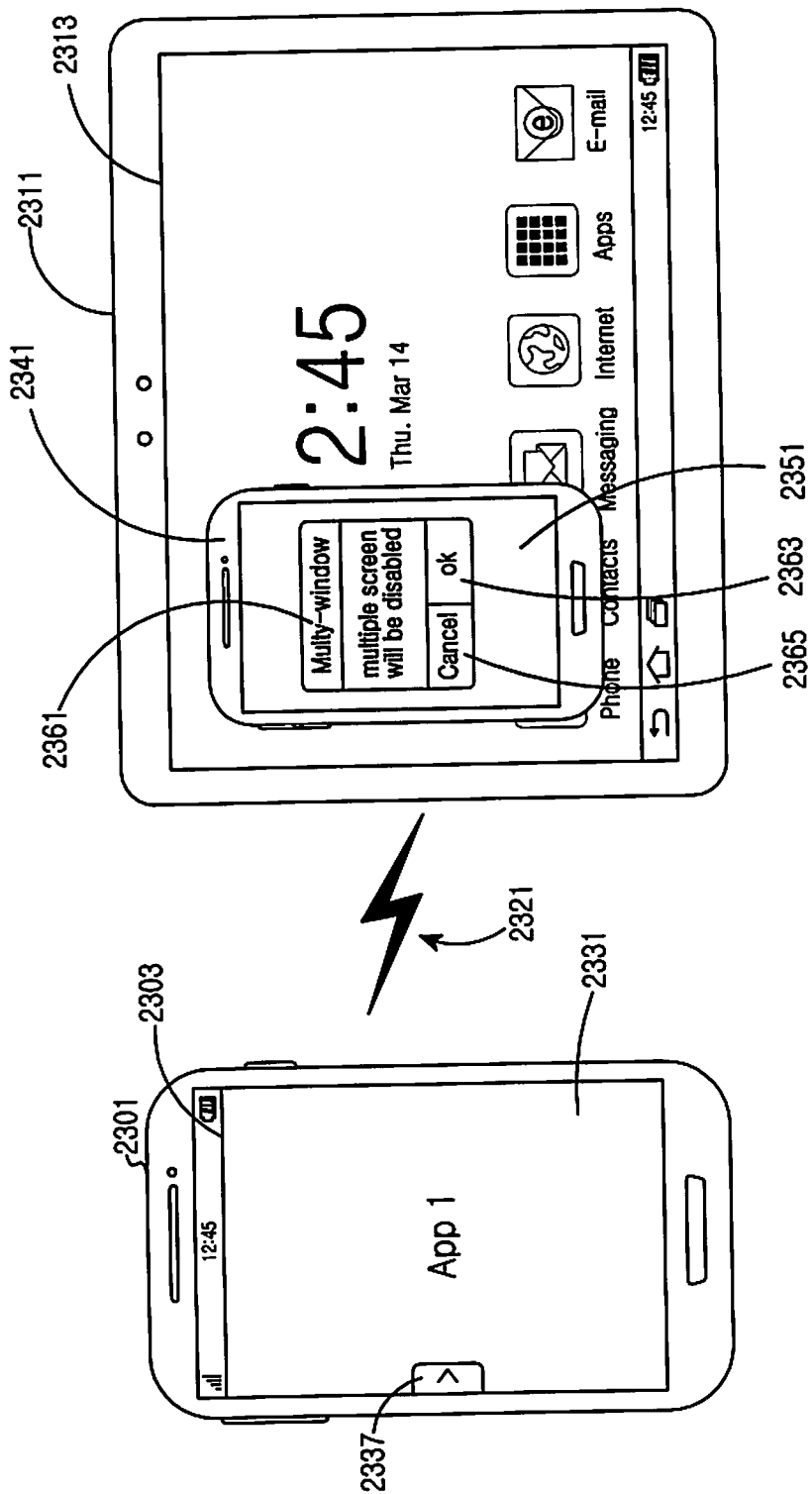

In the case where the second electronic device 2311 generates an event in order to stop displaying of screen share data at a point where the second electronic device 2311 controls screen configuration 2341 displaying screen share data, the second electronic device 2311 displays a popup window 2361 for determining whether to stop displaying of screen share data as illustrated in FIG. 23B.

Figure 23C:
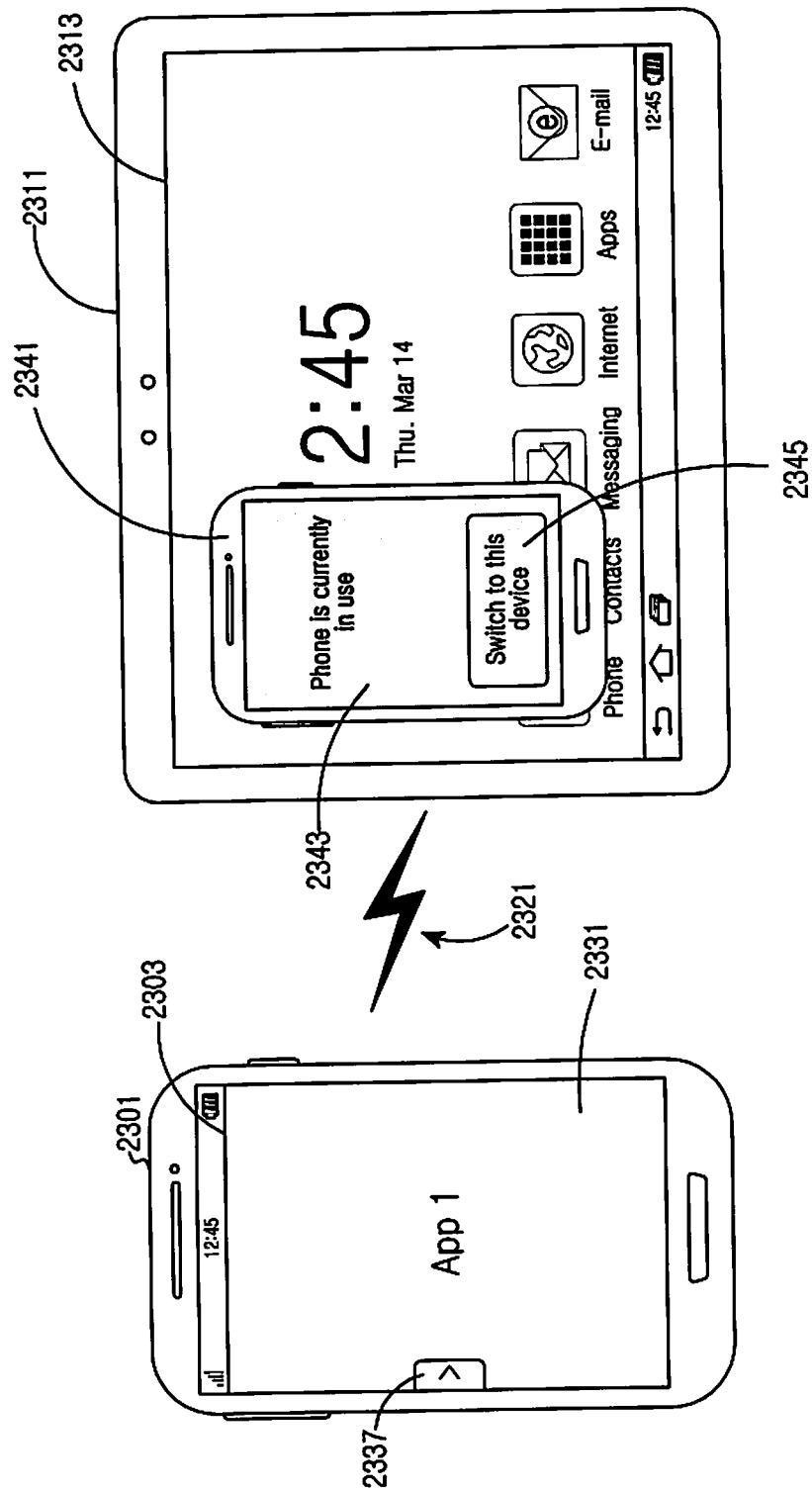

In the case where "OK" 2363 is selected in the popup window 2361, the first electronic device 2301 stops transmission of screen share data to the second electronic device 2311, and the second electronic device 2311 stops displaying of screen share data as illustrated in FIG. 23C as indicated by reference number 2343.

Although it has been described that an electronic device displays a blank image on a display unit in order to reduce power consumption according to various embodiments, the electronic device may reduce power consumption based on a characteristic of the display unit according to another embodiment. For still another embodiment, in the case where the display unit has lighting, as in an LCD, the electronic device may control the lighting of the display unit to reduce power consumption. For another example, in the case where the display unit does not have the lighting, as in an OLED, the electronic device may display a blank image to reduce power consumption.

Also, even when the display unit has the lighting as in an LCD, the electronic device may display a blank image to reduce power consumption.

As described above, the electronic device may reduce power consumption that occurs depending on screen sharing by stopping or resuming screen sharing based on state information of respective electronic devices while sharing the screen with a counterpart electronic device.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method in a first electronic device, the method comprising:
    connecting with at least one second electronic device;
    determining data to transmit to the at least one second electronic device;
    transmitting the data to the at least one second electronic device; and
    stopping transmission of the data based on state information of the at least one second electronic device while maintaining the connection with the at least one second electronic device,
    wherein the state information includes a display state of the data displayed in the at least one second electronic device.

2. The method of claim 1, wherein connecting with the at least one second electronic device comprises:
    connecting with the second electronic device using a wireless communication scheme or a wired communication scheme,
    wherein the wired communication scheme comprises one of a Universal Serial Bus (USB), a High Definition Multimedia Interface (HDMI), an Mobile High-Definition Link (MHL), and a display port, and the wireless communication scheme comprises cellular communication or a short distance wireless communication scheme.

3. The method of claim 2, wherein the short distance wireless communication scheme comprises one of Bluetooth, Zigbee, Wireless Fidelity (WiFi), WiFi direct, and Near Field Communication (NFC).

4. The method of claim 1, wherein determining the data to transmit to the second electronic device comprises:
determining a storage space for storing the data; and
determining the data to store in the storage space.

5. The method of claim 1, wherein stopping the transmission of the data comprises maintaining the connection with the at least one second electronic device.

6. The method of claim 1, wherein stopping the transmission of the data comprises, when a request for stopping data transmission occurs in the at least one second electronic device, stopping the transmission of the data.

7. The method of claim 1, further comprising, when an event occurs in the first electronic device, stopping the transmission of the data.

8. The method of claim 7, wherein the event comprises at least one of a touch input, a button input, an electronic pen input, call reception, message reception, and a notification.

9. The method of claim 7, further comprising, when the transmission of the data is stopped, resuming the stopped transmission of the data based on the state information or whether the event occurs.

10. The method of claim 1, wherein stopping the transmission of the data comprises stopping encoding of the data.

11. A method in a second electronic device, the method comprising:
connecting with at least one first electronic device;
receiving data from the at least one first electronic device;
displaying the received data;
determining whether an event for stopping displaying the data occurs based on state information of the second electronic device; and
in response to the occurrence of the event for stopping displaying the data, transmitting a request signal for stopping data transmission to the at least one first electronic device, while maintaining the connection with the at least one first electronic device,
wherein the state information includes a display state of the data displayed in the at least one second electronic device.

12. The method of claim 11, further comprising, when at least one state change of an idle mode, power off, rebooting, and screen turn-off occurs, transmitting the request signal for stopping the data transmission.

13. The method of claim 11, wherein the request signal for stopping the data transmission comprises:
when a region of a screen of the second electronic device displaying the data is hidden, transmitting the request signal for stopping the data transmission, and
wherein a case where the region displaying the data is hidden by the specific portion or more comprises a case where the displaying of the data is minimized or a display layer of an upper level than the region displaying the data is generated depending on driving of an application in the electronic device.

14. A first electronic device comprising:
at least one display;
at least one memory configured to store shared data with at least one second electronic device; and
at least one processor configured to:
perform a connection with the at least one second electronic device,
determine data to transmit to the second electronic device,
transmit the data to the second electronic device, and
stop transmission of the based on state information of the at least one second electronic device while maintaining the connection with the counterpart at least one second electronic device,
wherein the state information includes a display state of the data displayed in the at least one second electronic device.

15. The electronic device of claim 14, wherein the at least one processor is configured to perform the connection with the at least one second electronic device using a wireless communication scheme or a wired communication scheme, and
wherein the wired communication scheme comprises one of a USB, an HDMI, an MHL, and a display port, and the wireless communication scheme comprises cellular communication or a short distance wireless communication scheme.

16. The electronic device of claim 14, wherein the at least one processor is configured to:
determine a storage space for storing the data, and
determine the data to store in the storage space.

17. The electronic device of claim 14, wherein the at least one processor is configured to maintain the connection with the at least one second electronic device when transmission of the data is stopped.

18. The electronic device of claim 14, wherein the at least one processor is configured to stop transmission of the data, when a request for stopping data transmission is received from the at least one second electronic device.

19. The electronic device of claim 14, wherein the at least one processor is configured to stop the transmission of the data when an event occurs in the electronic device.

20. The electronic device of claim 19, wherein the event comprises at least one of a touch input, a button input, an electronic pen input, call reception, message reception, and a notification.

21. The electronic device of claim 14, wherein the at least one processor is configured to resume the stopped transmission of the data based on state information of the electronic device or the at least one second electronic device when the transmission of the data is stopped.

22. The electronic device of claim 14, wherein the at least one processor is configured to stops encoding of the data to transmit to the at least one second electronic device when the transmission of the data is stopped.

23. A second electronic device comprising:
at least one display;
at least one memory configured to store shared data with at least one first electronic device; and
at least one processor configured to:
perform a connection with the at least one first electronic device,
receive data from the at least one first electronic device,
display the received data on the display,
determine whether an event for stopping displaying the data occurs based on state information of the second electronic device, and
in response to the occurrence of the event for stopping the displaying of data, transmitting a request signal for stopping data transmission to the at least one first electronic device while maintaining the connection with the at least one first electronic device,
wherein the state information includes a display state of the data displayed in the at least one second electronic device.

24. The electronic device of claim 23, wherein when at least one state change of an idle mode, power off, rebooting, and screen turn-off occurs in the first electronic device, the at least one processor is configured to transmit the request signal for the stopping the data transmission.

25. The electronic device of claim 23, wherein the at least one processor is configured to:
 when a region of the display displaying the data is hidden, transmit the request signal for stopping the data transmission, and
 wherein a case where the region displaying the data is hidden comprises a case where the displaying of the data is minimized or a display layer of an upper level than the region displaying the data is generated depending on driving of an application in the electronic device.

* * * * *